(12) United States Patent
Tamagushi et al.

(10) Patent No.: US 10,438,179 B2
(45) Date of Patent: Oct. 8, 2019

(54) INFORMATION DELIVERY DEVICE, INFORMATION DELIVERY METHOD, PROGRAM PRODUCT, AND RECORDING MEDIUM

(71) Applicant: Rakuten, Inc., Tokyo (JP)

(72) Inventors: Yusuke Tamagushi, Tokyo (JP); Hideki Akashika, Tokyo (JP)

(73) Assignee: Rakuten, Inc., Setagawa-ku, Tokyo (JP)

( * ) Notice: Subject to any disclaimer, the term of this patent is extended or adjusted under 35 U.S.C. 154(b) by 902 days.

(21) Appl. No.: 14/439,566

(22) PCT Filed: Oct. 31, 2012

(86) PCT No.: PCT/JP2012/078252
§ 371 (c)(1),
(2) Date: Apr. 29, 2015

(87) PCT Pub. No.: WO2014/068736
PCT Pub. Date: May 8, 2014

(65) Prior Publication Data
US 2015/0302371 A1    Oct. 22, 2015

(51) Int. Cl.
*G06Q 40/00* (2012.01)
*G06Q 20/10* (2012.01)
(Continued)

(52) U.S. Cl.
CPC ....... *G06Q 20/105* (2013.01); *G06Q 20/0655* (2013.01); *G06Q 20/341* (2013.01); *G06Q 30/06* (2013.01)

(58) Field of Classification Search
USPC .................................................. 705/35–45
See application file for complete search history.

(56) References Cited

U.S. PATENT DOCUMENTS

| 5,596,642 A | * | 1/1997 | Davis | G06Q 20/02 380/30 |
| 6,722,573 B2 | * | 4/2004 | Haddad | G06Q 20/3437 235/379 |

(Continued)

FOREIGN PATENT DOCUMENTS

JP    2009-157738 A    7/2009

*Primary Examiner* — Kirsten S Apple
(74) *Attorney, Agent, or Firm* — Sughrue Mion, PLLC

(57) ABSTRACT

An object is to provide information more suited to the needs of the user by appropriately controlling timing with which information is provided to the user and the contents of the information. An electronic money server receives log data, identifies a store ID by searching a payment terminal DB by using a payment terminal ID of the log data as a key, checks a breakdown data providing store flag of a store DB (B) by using the store ID as a key, and, if a store is not a store providing the breakdown data, identifies the location of the store by searching a store DB (A) by using the store ID as a key. The electronic money server 2 acquires e-mail which conforms to the identified location by searching an e-mail (A) DB by using the identified location as a key. For example, it is information on a discount which is offered in a nearby store. The electronic money server creates e-mail (A), acquires an address by searching a user DB by using an electronic money number of the received log data as a key, and sends the created e-mail (A) to a mobile terminal.

9 Claims, 19 Drawing Sheets

(51) Int. Cl.
  *G06Q 20/06*  (2012.01)
  *G06Q 30/06*  (2012.01)
  *G06Q 20/34*  (2012.01)

(56) References Cited

U.S. PATENT DOCUMENTS

| | | | | |
|---|---|---|---|---|
| 7,311,246 B2* | 12/2007 | Arisawa | G06Q 20/10 | 235/379 |
| 8,600,835 B1* | 12/2013 | Lueck | G06Q 30/0283 | 705/26.1 |
| 2003/0006280 A1* | 1/2003 | Seita | G06K 7/0008 | 235/380 |
| 2004/0006536 A1* | 1/2004 | Kawashima | G06Q 20/04 | 705/39 |
| 2004/0039749 A1* | 2/2004 | Yokozawa | G06K 7/0008 | |
| 2006/0049259 A1* | 3/2006 | Kitada | G06F 15/025 | 235/451 |
| 2007/0080209 A1* | 4/2007 | Fujita | G06Q 20/06 | 235/380 |
| 2007/0135164 A1* | 6/2007 | Lee | G06O 20/20 | 455/558 |
| 2007/0180098 A1* | 8/2007 | Matsuo | G06Q 20/045 | 709/223 |
| 2007/0226135 A1* | 9/2007 | Yamada | G06Q 20/10 | 705/39 |
| 2008/0016004 A1* | 1/2008 | Kurasaki | G06Q 20/04 | 705/67 |
| 2008/0166995 A1* | 7/2008 | Sun | G06Q 20/085 | 455/406 |
| 2009/0050687 A1* | 2/2009 | Kon | G06Q 20/045 | 235/375 |
| 2009/0050689 A1* | 2/2009 | Sako | G06Q 20/0658 | 235/375 |
| 2010/0036742 A1* | 2/2010 | Ito | G06Q 20/202 | 705/21 |
| 2010/0041368 A1* | 2/2010 | Kumar | G06Q 20/02 | 455/407 |
| 2010/0145850 A1* | 6/2010 | Nagai | G06Q 20/105 | 705/41 |
| 2010/0241536 A1* | 9/2010 | Tanaka | G06Q 20/10 | 705/30 |
| 2011/0145146 A1* | 6/2011 | You | G06Q 20/28 | 705/44 |
| 2011/0195663 A1* | 8/2011 | Sakai | G06Q 10/00 | 455/41.2 |
| 2011/0276420 A1* | 11/2011 | White | G06Q 20/105 | 705/17 |
| 2012/0011062 A1* | 1/2012 | Baker | G06Q 20/105 | 705/41 |
| 2012/0173423 A1* | 7/2012 | Burdett | G06Q 20/3223 | 705/44 |
| 2012/0284081 A1* | 11/2012 | Cheng | G06Q 30/02 | 705/7.29 |
| 2013/0185167 A1* | 7/2013 | Mestre | G06Q 20/20 | 705/21 |
| 2013/0317895 A1* | 11/2013 | Turner | H04W 4/023 | 705/14.16 |
| 2014/0206311 A1* | 7/2014 | Carter | G06Q 20/20 | 455/408 |

* cited by examiner

Fig.6 (A)
USER DB

| USER ID | ELECTRONIC MONEY NUMBER | MANAGEMENT VALUE OF VALUE BALANCE | CONSENT TO RECEIVE INFORMATION PROVIDING SERVICE | NAME | ADDRESS | DATE OF BIRTH | TELE-PHONE NUMBER | E-MAIL ADDRESS |
|---|---|---|---|---|---|---|---|---|
| ⋮ | ⋮ | ⋮ | OBTAINED | ⋮ | ⋮ | ⋮ | ⋮ | ⋮ |
| ⋮ | ⋮ | ⋮ | OBTAINED | ⋮ | ⋮ | ⋮ | ⋮ | ⋮ |
| ⋮ | ⋮ | ⋮ | OBTAINED | ⋮ | ⋮ | ⋮ | ⋮ | ⋮ |
| ⋮ | ⋮ | ⋮ | NOT OBTAINED | ⋮ | ⋮ | ⋮ | ⋮ | ⋮ |

Fig.6 (B)
STORE DB (A)

| STORE ID | STORE NAME | LOCATION | TELEPHONE NUMBER | E-MAIL ADDRESS |
|---|---|---|---|---|
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |

Fig.7 (A)
STORE DB (B)

| STORE ID | BREAKDOWN DATA PROVIDING STORE FLAG | BATCH PROCESSING CYCLE | ... |
|---|---|---|---|
| ... | ... | ... | ... |
| ... | ... | ... | ... |
| ... | ... | ... | ... |
| ... | ... | ... | ... |

Fig.7 (B)
PAYMENT TERMINAL DB

| PAYMENT TERMINAL ID | STORE ID OF INSTALLATION STORE | ... |
|---|---|---|
| ... | ... | ... |
| ... | ... | ... |
| ... | ... | ... |
| ... | ... | ... |

IN THIS TIME, THANK YOU FOR USING OUR ELECTRONIC MONEY E.

<SPECIAL INFORMATION>

YOU CAN GET 10% DISCOUNT ON THE SPOT IF YOU MAKE PURCHASES TO THE VALUE OF 1000 YEN OR MORE AT A TIME AT CONVENIENCE STORE X IN SHINJUKU-KU BY USING ELECTRONIC MONEY E.
WE VERY MUCH HOPE YOU WILL USE OUR ELECTRONIC MONEY E.

= PERIOD =
FROM TODAY (APRIL 10)
TO APRIL 15

INFORMATION DELIVERY DEVICE, INFORMATION DELIVERY METHOD, PROGRAM PRODUCT, AND RECORDING MEDIUM

CROSS REFERENCE TO RELATED APPLICATIONS

This application is a National Stage of International Application No. PCT/JP2012/078252 filed Oct. 31, 2012, the contents of all of which are incorporated herein by reference in their entirety.

TECHNICAL FIELD

The present invention relates to information delivery devices, information delivery methods, program products, and recording media.

BACKGROUND ART

In recent years, the use of electronic money has become widespread. In electronic money, amount information called value is related to money value and fund settlement is performed by increasing or decreasing the value balance.

FIG. 19 is a diagram for explaining an existing electronic money system.

A mobile terminal 5 is a mobile terminal or the like which is owned by the user and is formed as a smartphone, a mobile telephone, a game console, a tablet computer, or the like, and, in an IC chip incorporated thereinto or attached thereto, the balance of value, an IC chip ID by which the IC chip is identified, an electronic money number, and so forth are recorded. Moreover, there is also an electronic money card 100 having the IC chip incorporated thereinto or attached thereto.

A method of holding value in a user's-side IC chip in this manner is called a stored value type.

An asynchronous payment terminal 7 is installed in a store, an automatic vending machine, and so forth, and performs payment by value by reducing the value balance stored in the IC chip by performing short-distance radio communication with the IC chip of the mobile terminal 5 or the electronic money card 100.

The asynchronous payment terminal 7 completes the payment processing locally between the asynchronous payment terminal 7 and the IC chip of the user without connecting to an electronic money server 2 and records the transaction history as log data.

Then, the asynchronous payment terminal 7 collectively sends the log data to the electronic money server 2 later at regular or irregular intervals.

The reason why the asynchronous payment terminal 7 is called "asynchronous" is that the asynchronous payment terminal completes the payment processing locally without being synchronous with the electronic money server 2.

In such a system of stored value-type electronic money, since the value balance is stored in the IC chip in advance and the value balance is reduced at the time of payment, if there is not enough value, it is impossible to perform payment. This makes it necessary for processing called recharging that increases the balance of value stored in the IC chip. This recharging is generally performed in exchange for money in the store and the exchange value of value is guaranteed.

On the other hand, in recent years, the communications capacity of the network has been remarkably improved, and a server management-type system that manages value with an electronic money server and performs payment processing on the electronic money server's side has also become known. It is expected that, with the improvement of a network infrastructure, such a server management-type system will become gradually widespread.

In a system of server-type electronic money, since value is not managed by an IC chip, it is necessary to synchronize it with value managed by the electronic money server 2 at all times. Therefore, a payment terminal used is a synchronous-type payment terminal, not the asynchronous-type payment terminal 7. Thus, the system of server-type electronic money is predicated on the presence of a synchronous payment terminal.

CITATION LIST

Patent Literature

Patent Document 1: JP-A-2009-157738

DISCLOSURE OF INVENTION

Problem to be Solved by the Invention

Incidentally, a mechanism by which, at the time of payment by using electronic money, information by which a reader/writer is identified is received from the reader/writer of a payment terminal installed in a store or an automatic vending machine via a mobile terminal of the user and information on the surrounding area is provided to the mobile terminal based on the information on a location in which the reader/writer is installed has been proposed (Patent Document 1).

However, even when the information based on the location of the reader/writer is simply provided, the information is not always the information suited to the needs of the user.

A problem to be solved by the present invention is to provide information more suited to the needs of the user by appropriately controlling timing with which information is provided to the user and the contents of information which is provided to the user.

SUMMARY OF THE INVENTION

The invention described in claim 1 provides an information delivery device comprising: a first acquiring unit that acquires, from a store terminal provided with a generating unit that generates log data containing store identification information identifying a store in which balance change processing has been performed, the balance change processing by which a balance of electronic money stored in an IC chip is changed, and a writing unit that writes the store identification information into the IC chip in a state in which the store identification information is related to the balance change processing, log data which is generated by the generating unit; a second acquiring unit that acquires, from a mobile terminal connectable to the IC chip, the store identification information which is written into the IC chip in a state in which the store identification information is related to the balance change processing; a determining unit that determines, by referring to a store information storing unit storing, for each store, data indicating whether or not there is a possibility that related information that is related to the balance change processing and is not contained in the log data of the balance change processing is acquired after a current time point if the store identification information is acquired by the second acquiring unit, whether or not there is the possibility that the related information is acquired after the current time point for a store identified by the store identification information acquired by the second acquiring unit; a first providing unit that immediately provides information related to the store identified by the store identification information acquired by the second acquiring unit to the mobile terminal that has sent the store identification information if a determination that there is the possibility that the related information is acquired after the current time point is not made by the determining unit; and a second providing unit that provides information selected by using the related information to a user of the IC chip whose balance has been changed by balance change processing related to the related information if the related information is acquired.

The invention described in claim 2 provides the information delivery device according to claim 1, wherein the related information is breakdown information related to the balance change processing, the store information storing unit stores, for each store, data indicating whether or not the store is a breakdown providing store that provides the breakdown information after a completion of balance change processing, and if the store identified by the store identification information acquired by the second acquiring unit is the breakdown providing store, the determining unit makes a determination on the store that there is the possibility that the related information is acquired after the current time point.

The invention described in claim 3 the information delivery device according to claim 2, wherein only when the store identified by the store identification information acquired by the second acquiring unit is a real existing store, the first providing unit provides information related to the store.

The invention described in claim 4 the information delivery device according to claim 3, wherein the writing unit further writes time information identifying a time at which the balance change processing has been performed into the IC chip in a state in which the time information is related to the balance change processing, the second acquiring unit further acquires the time information which is written into the IC chip in a state in which the time information is related to the balance change processing, and only when a time identified by the time information is a time after a time point a predetermined time prior to the current time point, the first providing unit provides information related to another store located in an area including a location of the store identified by the store identification information acquired by the second acquiring unit.

The invention described in claim 5 the information delivery device according to any one of claims 1 to 4, wherein the store information storing unit further stores cycle information indicating a cycle of batch processing by which log data is sent, the log data which is generated by the generating unit in the store terminal, and the first providing unit refers to the cycle information which is stored in the store information storing unit and, if acquiring the log data by the first acquiring unit, the log data which is sent from the store identified by the store identification information acquired by the second acquiring unit, by a time point a predetermined time after a present moment is expected to be impossible, provides information related to the store.

The invention described in claim 6 the information delivery device according to any one of claims 1 to 5, wherein only when information is not provided by the second providing unit, the first providing unit provides information related to the store.

The invention described in claim 7 the information delivery device according to any one of claims 1 to 6, wherein the first providing unit selects information related to the store such that same information is not provided to a same user in a predetermined period by referring to a unit that records information which has already been provided in a state in which the information is related to an IC chip to which the information has been provided.

The invention described in claim 8 an information delivery method by a computer, the method comprising: a first acquiring step of acquiring, from a store terminal provided with a generating unit that generates log data containing store identification information identifying a store in which balance change processing has been performed, the balance change processing by which a balance of electronic money stored in an IC chip is changed, and a writing unit that writes the store identification information into the IC chip in a state in which the store identification information is related to the balance change processing, log data which is generated by the generating unit; a second acquiring step of acquiring, from a mobile terminal connectable to the IC chip, the store identification information which is written into the IC chip in a state in which the store identification information is related to the balance change processing; a determining step of determining, by referring to a store information storing unit storing, for each store, data indicating whether or not there is a possibility that related information that is related to the balance change processing and is not contained in the log data of the balance change processing is acquired after a current time point if the store identification information is acquired in the second acquiring step, whether or not there is the possibility that the related information is acquired after the current time point for a store identified by the store identification information acquired in the second acquiring step; a first providing step of immediately providing information related to the store identified by the store identification information acquired in the second acquiring step to the mobile terminal that has sent the store identification information if a determination that there is the possibility that the related information is acquired after the current time point is not made in the determining step; and a second providing step of providing information selected by using the related information to a user of the IC chip whose balance has been changed by balance change processing related to the related information if the related information is acquired.

The invention described in claim 9 a program product for making a computer implement: a first acquiring function of acquiring, from a store terminal provided with a generating unit that generates log data containing store identification information identifying a store in which balance change processing has been performed, the balance change processing by which a balance of electronic money stored in an IC chip is changed, and a writing unit that writes the store identification information into the IC chip in a state in which the store identification information is related to the balance change processing, log data which is generated by the generating unit; a second acquiring function of acquiring, from a mobile terminal connectable to the IC chip, the store identification information which is written into the IC chip in a state in which the store identification information is related to the balance change processing; a determining function of determining, by referring to a store information storing unit storing, for each store, data indicating whether or not there is a possibility that related information that is related to the balance change processing and is not contained in the log data of the balance change processing is acquired after a current time point if the store identification information is acquired by the second acquiring function, whether or not there is the possibility that the related information is acquired after the current time point for a store identified by the store identification information acquired by the second acquiring function; a first providing function of immediately providing information related to the store identified by the store identification information acquired by the second acquiring function to the mobile terminal that has sent the store identification information if a determination that there is the possibility that the related information is acquired after the current time point is not made by the determining function; and a second providing function of providing information selected by using the related information to a user of the IC chip whose balance has been changed by balance change processing related to the related information if the related information is acquired.

Provided herein is a computer-readable recording medium on which a program product is recorded, the program product for making a computer implement: a first acquiring function of acquiring, from a store terminal provided with a generating unit that generates log data containing store identification information identifying a store in which balance change processing has been performed, the balance change processing by which a balance of electronic money stored in an IC chip is changed, and a writing unit that writes the store identification information into the IC chip in a state in which the store identification information is related to the balance change processing, log data which is generated by the generating unit; a second acquiring function of acquiring, from a mobile terminal connectable to the IC chip, the store identification information which is written into the IC chip in a state in which the store identification information is related to the balance change processing; a determining function of determining, by referring to a store information storing unit storing, for each store, data indicating whether or not there is a possibility that related information that is related to the balance change processing and is not contained in the log data of the balance change processing is acquired after a current time point if the store identification information is acquired by the second acquiring function, whether or not there is the possibility that the related information is acquired after the current time point for a store identified by the store identification information acquired by the second acquiring function; a first providing function of immediately providing information related to the store identified by the store identification information acquired by the second acquiring function to the mobile terminal that has sent the store identification information if a determination that there is the possibility that the related information is acquired after the current time point is not made by the determining function; and a second providing function of providing information selected by using the related information to a user of the IC chip whose balance has been changed by balance change processing related to the related information if the related information is acquired.

Effect of the Invention

According to the present invention, by identifying a store in which electronic value was used, it is possible to control appropriately timing with which information is provided to the user and the contents of information which is provided depending on the circumstances of the store. Therefore, it is possible to send information more suited to the needs of the user.

BRIEF DESCRIPTION OF DRAWINGS

FIG. 6 is a diagram for explaining a user DB and a store DB (A) of the electronic money server;

FIG. 7 is a diagram for explaining a store DB (B) and a payment terminal DB of the electronic money server;

DESCRIPTION OF EMBODIMENTS (1) Outline of an Embodiment

In this embodiment, timing with which information is provided to a mobile terminal 5 from an electronic money server 2 and the contents of the information are determined depending on the circumstances of a store in which electronic money was used. In particular, timing with which information is provided and the contents of the information are determined depending on whether or not it is expected that related information (for example, breakdown information indicating the breakdown of payment, attribute information input to a POS terminal or the like as the attribute of the user who performed the payment, information on the weather in a location in which payment was performed at the time of payment, coupon application information indicating whether or not a predetermined coupon was used in payment, and so forth) which is not recorded on log data that is generated when electronic money payment processing (an example of balance change processing) is performed but is related to the payment processing can be acquired later.

For example, if the store is a store that does not provide payment breakdown data (an example of related information), e-mail containing information related to the location of the store is sent while the user is around the store.

On the other hand, if the store is a store that provides payment breakdown data (a breakdown providing store), after the breakdown data is provided from the store, in consideration of the breakdown data and the past purchase history, e-mail containing information that is supposed to be more suited to the needs of the user is sent.

In addition to those described above, as information used to decide which information to be output, there are the cycle of batch processing, whether or not the store is a real existing store, whether or not the installed payment terminal is a synchronous-type payment terminal (if payment is performed by the synchronous-type payment terminal, the electronic money server 2 acquires log data in real time without acquiring log data from the mobile terminal 5), and so forth.

(2) Details of the Embodiment

Figure 1:
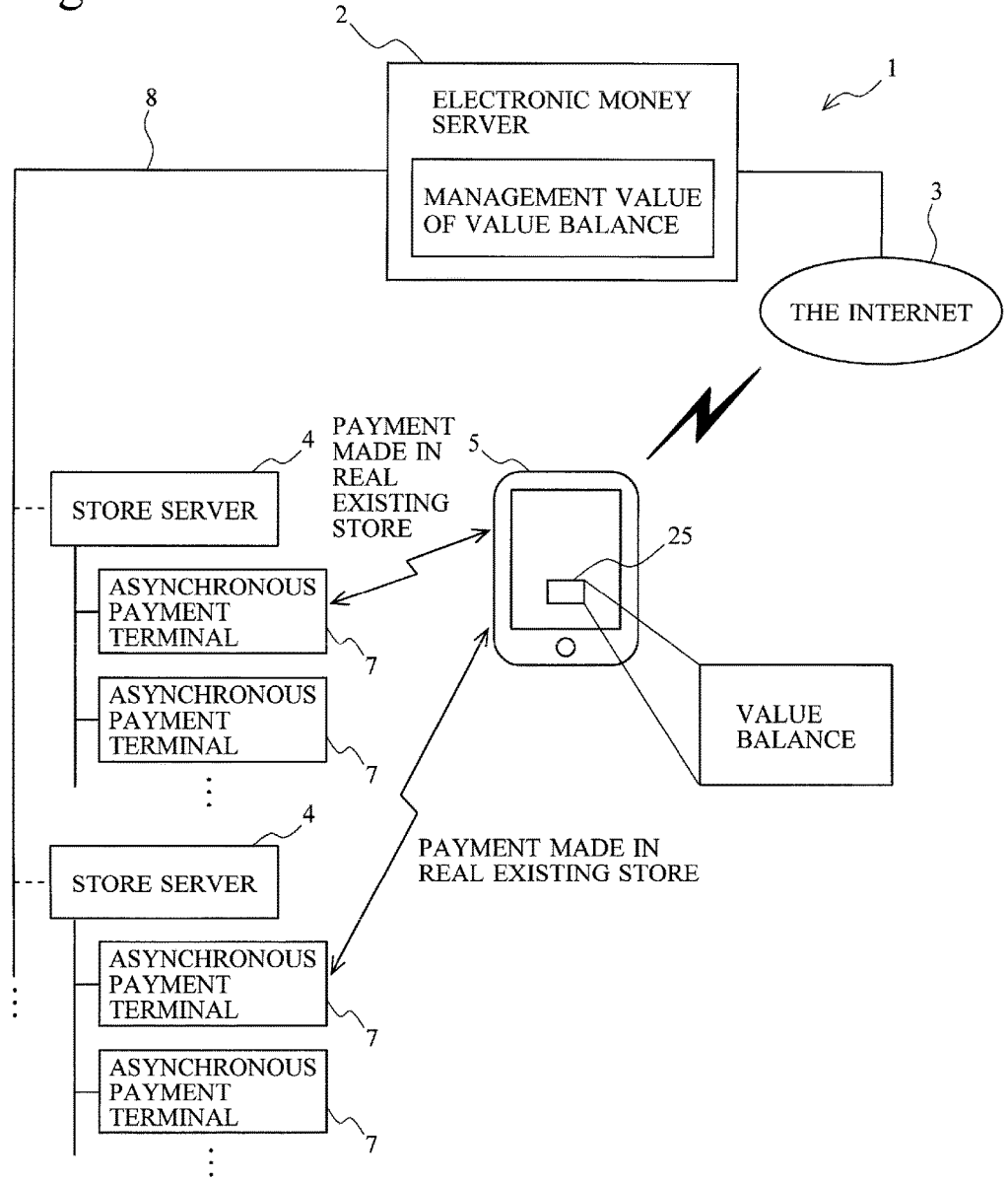
FIG. 1 is a diagram for explaining the network configuration of an electronic money system according to this embodiment.

FIG. 1 is a diagram for explaining the network configuration of an electronic money system 1 according to a first embodiment.

The electronic money system 1 is configured by using the electronic money server 2, the Internet 3, a store server 4, the mobile terminal 5, a payment terminal 6 (not depicted in the drawing), an asynchronous payment terminal 7, a communication line 8, and so forth.

The electronic money server 2 is a server that manages the transfer of money value by value. Here, value is electronic information related to money value, and the electronic money system 1 transfers money value by increasing or decreasing the balance of value (hereinafter, the value balance).

In addition, a business entity of the electronic money system. 1 relates the transfer of value to the transfer of actual money by transferring actual money in response to the transfer of value.

The electronic money server 2 stores a management value of the value balance in a state in which the management value is related to the mobile terminal 5 for management. As will be described later, the mobile terminal 5 stores the value balance in a general-purpose IC chip 25 in the mobile terminal 5.

It is preferable that they are the same value as a result of being synchronized with each other at all times. However, in actuality, there are a large number of asynchronous payment terminals 7 that cannot establish real-time connection to the electronic money server 2. Therefore, the generated log data is sent to the electronic money server 2 later by batch processing to make them in synchronism with each other ex post facto.

In this embodiment, a stored value-type electronic money system that manages value on the side of the mobile terminal 5 or an electronic money card 100 will be described, but there is also server management-type electronic money that manages value on the side of the electronic money server 2.

The mobile terminal 5 is a mobile terminal formed as, for example, a smartphone, a mobile telephone, a game console, a tablet computer, or the like and has the function of connecting to the Internet 3 and the function of connecting to the payment terminal 6 and the asynchronous payment terminal 7 by short-distance radio communication.

The mobile terminal 5 has the general-purpose IC chip 25 which is incorporated thereinto or attached thereto and stores an electronic money number and the value balance therein.

Moreover, the electronic money card 100 also has the general-purpose IC chip 25 which is incorporated thereinto or attached thereto and stores an electronic money number and the value balance therein.

The communication line 8 is a line that connects the electronic money server 2 with the payment terminal 6 or the asynchronous payment terminal 7. As the communication line 8, a dedicated line can be used, and a general-purpose line such as the Internet 3 may also be used.

The asynchronous payment terminal 7 is installed in, for example, a store and an automatic vending machine with inconvenient network equipment and has the function of performing short-distance radio communication with the mobile terminal 5.

The asynchronous payment terminal 7 makes payment by using the value balance by performing short-distance radio communication with the mobile terminal 5 or the electronic money card 100. The asynchronous payment terminal 7 is usually not connected to the electronic money server 2 (therefore cannot make payment by using the server management-type electronic money) and temporarily stores the details of the payment performed between the asynchronous payment terminal 7 and the mobile terminal 5 as log data.

Then, the asynchronous payment terminal 7 connects to the electronic money server 2 around once a day by using the communication line 8 and sends the log data to the electronic money server 2. In an environment with no network communication equipment, a person in charge sometimes manually collects a recording medium on which the log data is recorded.

As for the value balance, the electronic money server 2 manages the fund transfer based on the log data in the payment terminal 6 and the asynchronous payment terminal 7.

This electronic money server 2 can also be configured such that the electronic money server 2 connects to a server of a bank or a credit company, whereby, when the electronic money server 2 recharges the general-purpose IC chip 25, the electronic money server 2 makes payment for recharging by withdrawal from an account of the bank or by using a credit number of the user.

In the example depicted in FIG. 1, a plurality of asynchronous payment terminals 7 are installed in the store and are connected to the store server 4 by a LAN (local area network).

Incidentally, though not depicted in FIG. 1, the payment terminal 6 performs short-distance radio communication with the mobile terminal 5 or the electronic money card 100 and also performs communication with the electronic money server 2 via the communication line 8, thereby sending information such as a payment amount to the electronic money server 2 and relaying the communication between the electronic money server 2 and the mobile terminal 5. The payment terminal 6 is a synchronous payment terminal that performs online communication with the electronic money server 2 in real time at the time of payment using the mobile terminal 5.

The payment terminal 6 is installed in an accounting counter, an automatic vending machine, or the like of a real existing store (a real existing store that is physically open in a real existing store or the like) such as a convenience store.

Figure 2:
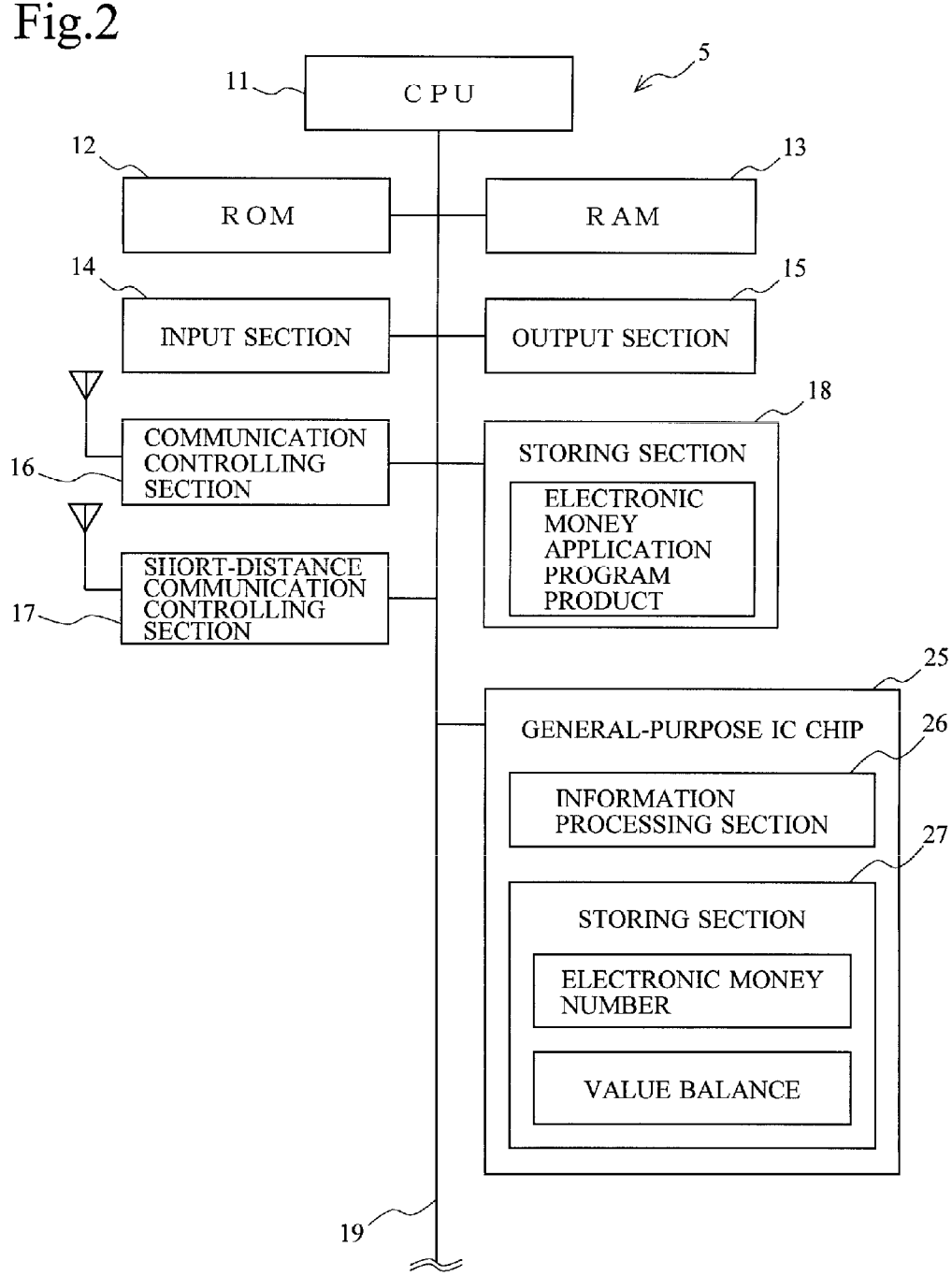
FIG. 2 is a diagram for explaining the hardware configuration of a mobile terminal.

FIG. 2 is a diagram depicting the hardware configuration of the mobile terminal 5. Here, as an example, it is assumed that the mobile terminal 5 is a smartphone, but the same goes for a mobile telephone. However, the game console and the tablet computer often have only the function of performing radio communication with an access point of a wireless LAN. The smartphone also often has the function of performing radio communication with the access point of the wireless LAN.

The mobile terminal 5 is formed of a CPU (Central Processing Unit) 11, ROM (Read Only Memory) 12, RAM (Random Access Memory) 13, an input section 14, an output section 15, a communication controlling section 16, a short-distance communication controlling section 17, a storing section 18, the general-purpose IC chip 25, and so forth which are connected to one another by a bus line 19.

The CPU 11 performs various kinds of information processing and overall control of the mobile terminal 5 by executing a program product recorded on the ROM 12 and the storing section 18. In this embodiment, for example, the CPU 11 supports payment processing using the value balance by cooperating with the electronic money server 2 by the function provided by an electronic money application program product which will be described later.

The ROM 12 is read-only memory, and a basic program product used by the mobile terminal 5 to operate, a parameter, data, and so forth are recorded thereon.

The RAM 13 is readable/writable memory and offers working memory used when the CPU 11 performs information processing.

The output section 15 is a functional section that outputs information to the user and is provided with a liquid crystal display for screen display, a speaker from which sound is output, and so forth. On the liquid crystal display, for example, an icon for starting the electronic money application program product is displayed.

The input section 14 is a functional section that inputs information from the outside and is provided with a touch panel installed on the liquid crystal display, a microphone that inputs sound, a camera that takes an image of a subject, and so forth. By touching the touch panel in response to the display on the liquid crystal display, the user can enter information.

The storing section 18 is formed by using, for example, a recording medium such as an EEPROM (Electrically Erasable and Programmable ROM) and a hard disk, and an OS (Operating System) which is a basic program product that controls the mobile terminal 5, the electronic money application program product that supports payment by value, and other program products and data are recorded thereon.

The communication controlling section 16 includes an antenna for performing radio communication with a base station antenna of a mobile telephone network and connects the mobile terminal 5 to the Internet 3 or a telephone line. The mobile terminal 5 can perform communication with the electronic money server 2 through the communication controlling section 16 via the Internet 3.

The short-distance communication controlling section 17 includes an antenna for performing short-distance radio communication with reader/writers of the payment terminal 6 and the asynchronous payment terminal 7 and connects the general-purpose IC chip 25 to the payment terminal 6 and the asynchronous payment terminal 7. In addition to performing communication with the payment terminal 6 via the short-distance communication controlling section 17, the general-purpose IC chip 25 can perform communication with the electronic money server 2 via the mobile terminal 5.

The general-purpose IC chip 25 is an IC chip that stores a general-purpose application and is incorporated into or attached to the mobile terminal 5. The user can store the downloaded application in the general-purpose IC chip 25.

The general-purpose IC chip 25 is formed of a CPU, RAM, ROM, and so forth and is provided with an information processing section 26 that performs information processing in accordance with various program products and a storing section 27 formed of nonvolatile memory.

In the storing section 27, an electronic money number, the value balance, though not depicted in the drawing, a value operation program product used by the information processing section 26 to operate the value balance, authentication data used by the electronic money server 2 to authenticate the general-purpose IC chip 25, and so forth are stored.

The electronic money number is a number used by the electronic money server 2 to identify the user thereof.

Payment processing (reduction processing) and recharging processing (increase processing) related to the value balance in the general-purpose IC chip 25 are performed by the value operation program product formed in the information processing section 26 in the general-purpose IC chip 25 in accordance with an instruction from the outside. This is performed in order to increase security by limiting processing of the value balance to the inside of the general-purpose IC chip 25.

Incidentally, as for processing of the value balance, information to be input to the general-purpose IC chip 25 is encrypted and is decoded in the general-purpose IC chip 25, and information to be output from the general-purpose IC chip 25 is output after being encrypted in the chip.

Figure 3:
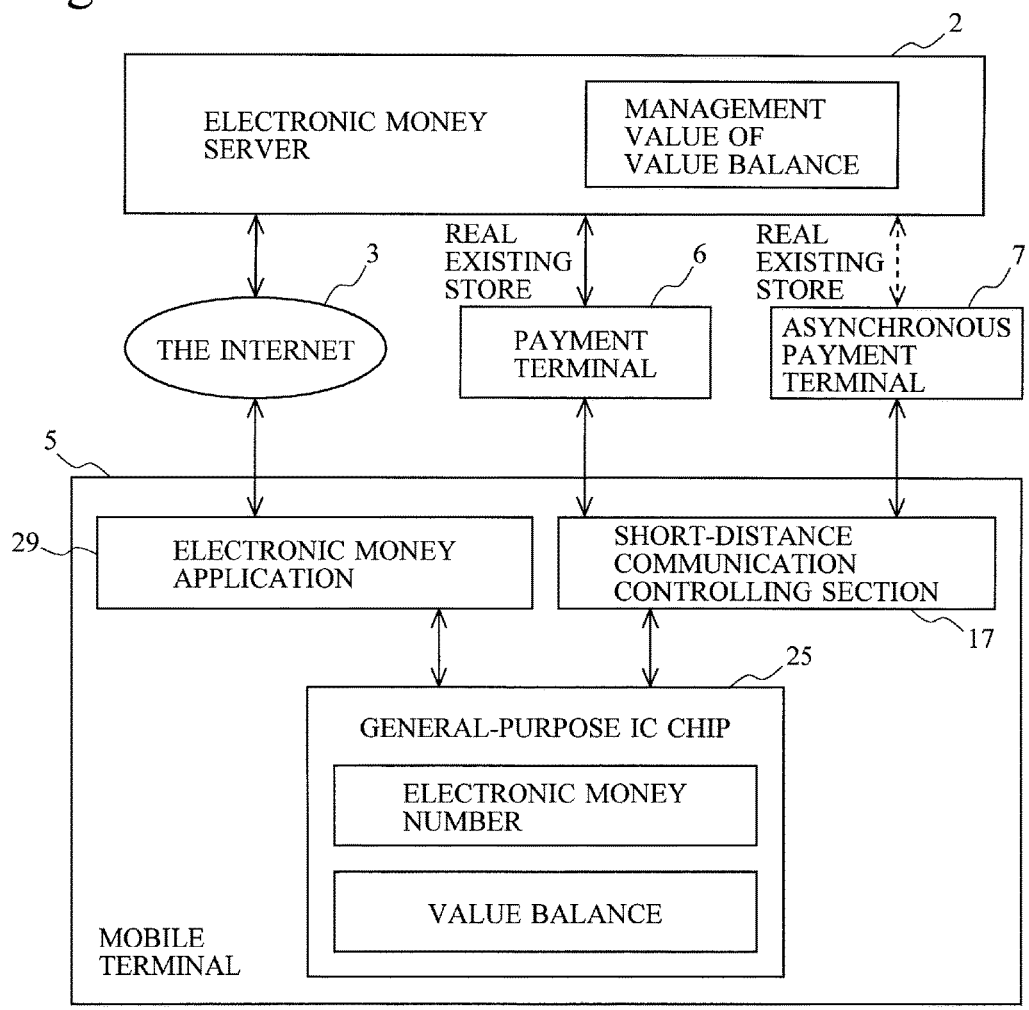
FIG. 3 is a diagram for explaining the function of the mobile terminal.

FIG. 3 is a diagram for explaining the function of the mobile terminal 5.

When the electronic money application program product is executed, an electronic money application 29 is formed in the mobile terminal 5.

In the case of payment in a real existing store provided with the payment terminal 6, the short-distance communication controlling section 17 performs communication with the payment terminal 6 and performs communication with the electronic money server 2 via the payment terminal 6.

In the case of payment in a real existing store provided with the asynchronous payment terminal 7, the short-distance communication controlling section 17 performs communication with the asynchronous payment terminal 7.

Moreover, the electronic money application 29 can access the general-purpose IC chip 25.

In the case of payment in a real existing store, the short-distance communication controlling section 17 can increase or decrease the value balance and read the electronic money number by operating the value operation program product in the general-purpose IC chip 25.

Then, when payment processing is performed, the general-purpose IC chip 25 receives, via the short-distance communication controlling section 17, a request from the asynchronous payment terminal 7 to update (reduce) the value balance and updates (reduces) the value balance.

As the value balance update processing that is performed here, the following methods are possible.

(Method 1) A case where an overwriting instruction is sent as a value balance update request.

In this case, the electronic money server 2 subtracts an amount corresponding to a shortfall from the value balance received from the CPU of the general-purpose IC chip 25 of the mobile terminal 5 and calculates the balance after subtraction. Then, the asynchronous payment terminal 7 sends, as the value balance update request, an overwriting instruction by which overwriting is performed on the balance after calculation. The CPU of the general-purpose IC chip 25 of the mobile terminal 5 performs update by performing overwriting with the value balance in accordance with the overwriting instruction.

(Method 2) A case where a subtraction instruction is sent as the value balance update request.

In this case, the asynchronous payment terminal 7 sends a subtraction instruction by which an amount corresponding to a shortfall is subtracted from the value balance to the CPU of the general-purpose IC chip 25 of the mobile terminal 5 as the value balance update request. The CPU of the general-purpose IC chip 25 of the mobile terminal 5 updates the value balance by subtracting the amount corresponding to the shortfall from the value balance in accordance with the instruction.

Then, the general-purpose IC chip 25 notifies the asynchronous payment terminal 7 of the update of the value balance.

Next, recharging which is performed in a real existing store will be described.

This recharging is based on the premise that a store clerk who operates the asynchronous payment terminal 7 has received money corresponding to value by which recharging is to be performed. Then, when recharging processing is performed, the general-purpose IC chip 25 receives, via the short-distance communication controlling section 17, a request from the asynchronous payment terminal 7 to update (increase) the value balance and updates (increases) the value balance.

Then, the general-purpose IC chip 25 notifies the asynchronous payment terminal 7 of the update of the value balance.

In this recharging, it is also possible to perform recharging directly from the electronic money server 2 without the asynchronous payment terminal 7. In this case, access is made to the electronic money server 2 via the communication controlling section 16 of the mobile terminal 5, and the procedures such as user authentication processing, permission from an authentication organization server such as a credit company server, and so forth are executed. Then, the mobile terminal 5 receives amount change (increase) information from the electronic money server 2, and the general-purpose IC chip 25 updates (increases) the value balance.

This recharging from the electronic money server 2 is performed as a series of processing.

Figure 4:
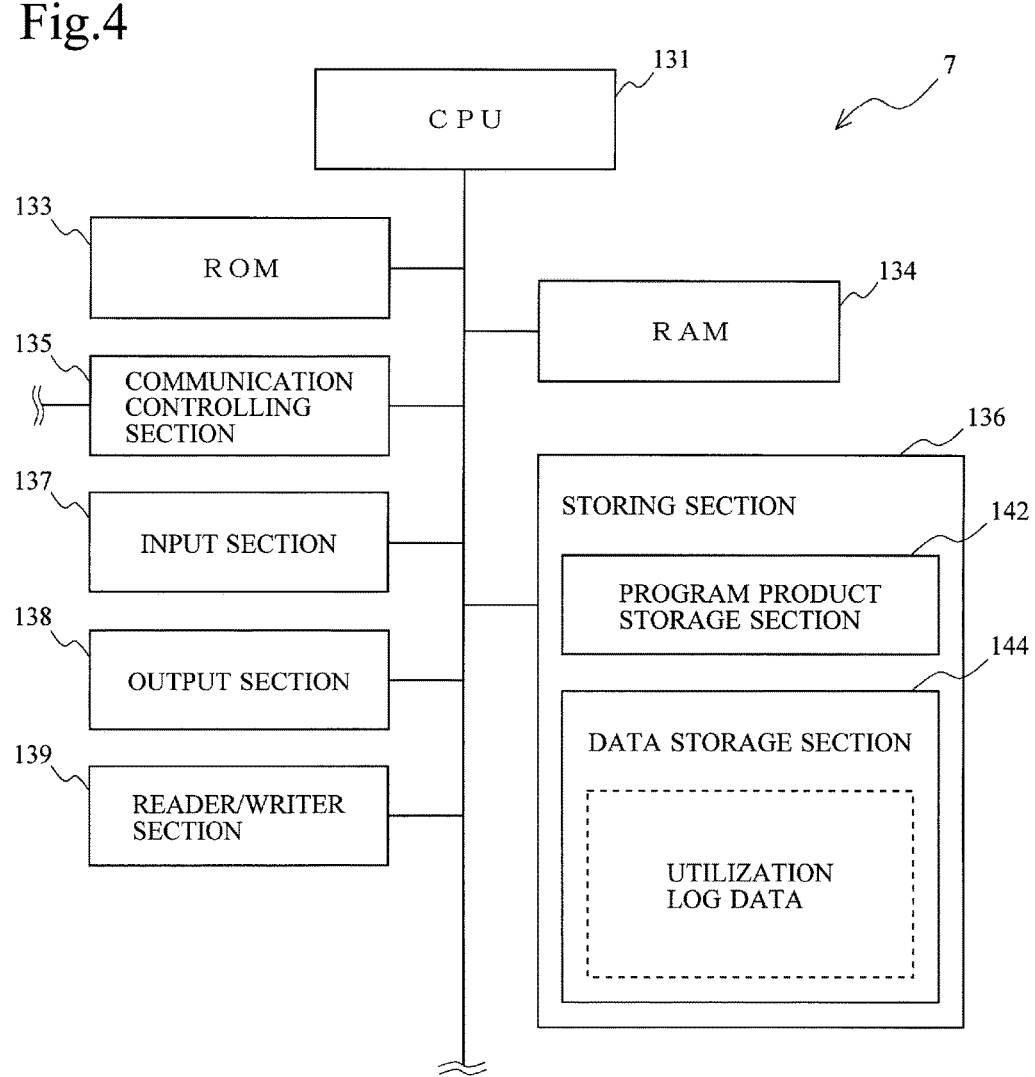
FIG. 4 is a diagram for explaining the configuration of an asynchronous payment terminal.

FIG. 4 is a diagram depicting the hardware configuration of the asynchronous payment terminal 7.

The asynchronous payment terminal 7 is formed of a CPU 131, ROM 133, RAM 134, a communication controlling section 135, a storing section 136, an input section 137, an output section 138, a reader/writer section 139, and so forth which are connected to one another via a bus line and has the function as a payment processing device.

In addition to performing information processing in accordance with a predetermined program product, the CPU 131 performs overall control of the asynchronous payment terminal 7. In this embodiment, the CPU 131 sends amount change information to the mobile terminal 5 to make the general-purpose IC chip 25 perform amount change processing.

The ROM 133 is read-only memory storing a basic program product for making the asynchronous payment terminal 7 operate, a parameter, and so forth.

The RAM 134 is memory on which writing and reading can be performed at any time, the memory that offers working memory of the CPU 131 and loads the program product and the data stored in the storing section 136 and stores the program product and the data.

The communication controlling section 135 is a connection device that connects the asynchronous payment terminal 7 to the electronic money server 2 via a network.

If the asynchronous payment terminal 7 is the asynchronous payment terminal 7 installed in a store, the input section 137 is provided with an input device such as a keyboard and a barcode reader, for example, such that an operator can enter a product code, a payment amount, a recharging amount, and so forth.

Moreover, if the asynchronous payment terminal 7 is the asynchronous payment terminal 7 installed in a pass gate, the input section 137 is connected to a control device of the pass gate, for example, and accepts the input of a payment amount from the control device of the pass gate.

If the asynchronous payment terminal 7 is the asynchronous payment terminal 7 installed in a store, the output section 138 is connected to, for example, a liquid crystal display device, a printer, an audio output device, and so forth and presents information to a customer or an operator of a member store.

Moreover, if the asynchronous payment terminal 7 is the asynchronous payment terminal 7 installed in a pass gate, for example, the output section 138 is connected to a drive unit that drives a gate door and a warning lamp, an audio output device, and the like which are installed in the pass gate, and opens and closes the gate door and makes the warning lamp flash or produces a warning tone in synchronism with the opening and closing of the gate door.

The reader/writer section 139 has a built-in antenna and performs radio communication with the general-purpose IC chip 25 of the electronic money card 100.

If the asynchronous payment terminal 7 is the asynchronous payment terminal 7 installed in a store, the reader/writer section 139 is installed near a cash register, such that the user can bring the electronic money card 100 closer to the reader/writer section 139 when paying for a product.

Moreover, if the asynchronous payment terminal 7 is the asynchronous payment terminal 7 installed in a pass gate, the reader/writer section 139 is installed on the top face of the pass gate in a position closer to the front than a gate door, such that the user can bring the electronic money card 100 closer to the reader/writer section 139 when passing through the pass gate.

The storing section 136 is formed of, for example, a hard disk or other storage media and a drive unit that drives them, and is formed of a program product storage section 142 that stores various program products, a data storage section 144 that stores data, and so forth.

In the program product storage section 142, an OS that is a basic program product for making the asynchronous payment terminal 7 function, a program product for making the electronic money card 100 perform amount change processing and the electronic money server 2 perform recharging to add an amount corresponding to a shortfall, and so forth are stored.

In the data storage section 144, a terminal ID that is ID information of the asynchronous payment terminal 7, utilization log data that is the history of transactions with the mobile terminal 5 and the electronic money card 100, and so forth are stored. This utilization log data is sent to the electronic money server 2 by batch processing that is performed by the CPU 131.

Incidentally, in the case of the payment terminal 6 that connects to the electronic money server 2 in real time, the log data is sent to the electronic money server 2 in real time.

Figure 5:
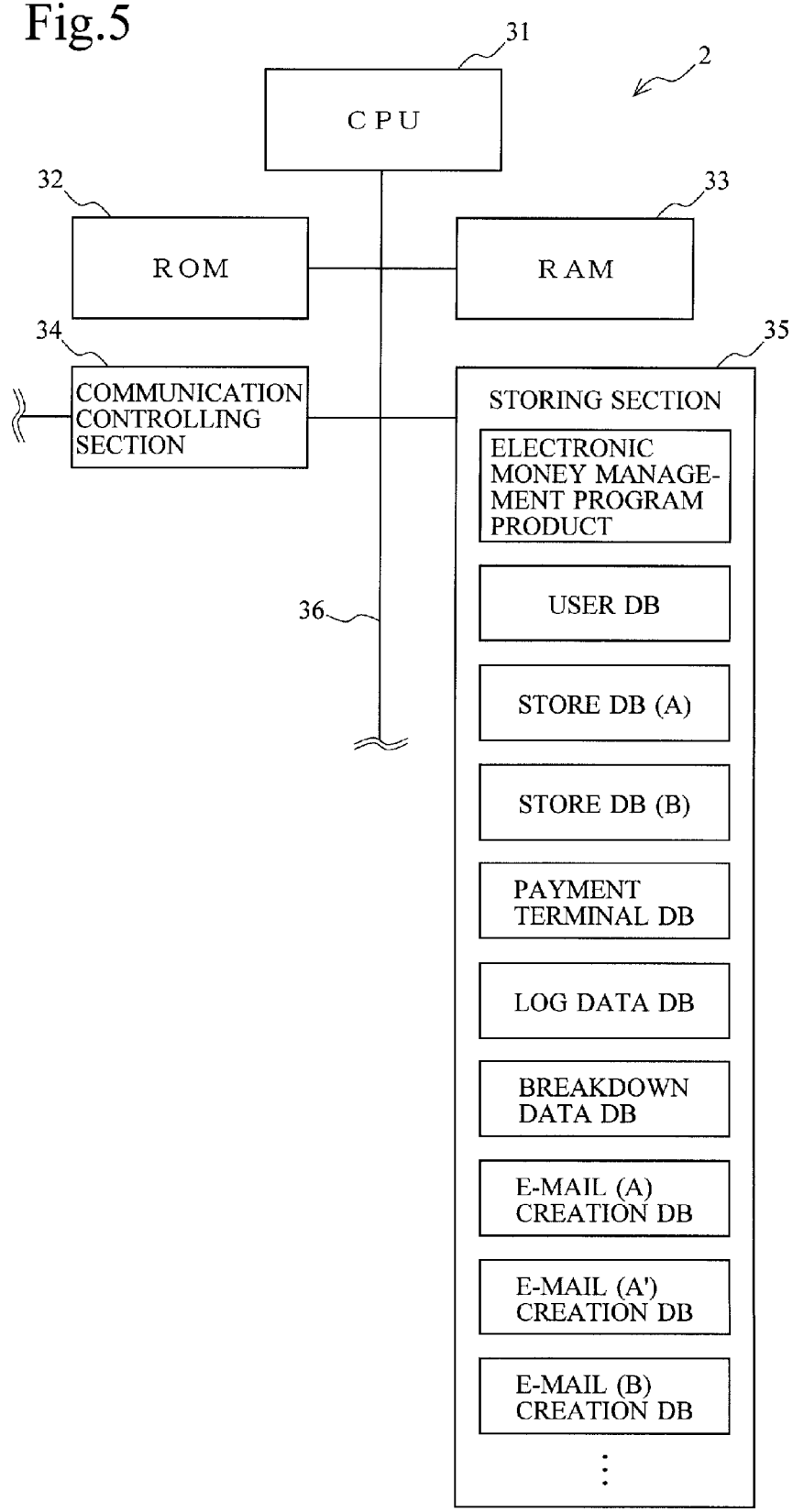
FIG. 5 is a diagram for explaining the configuration of an electronic money server.

FIG. 5 is a diagram for explaining the configuration of the electronic money server 2.

The electronic money server 2 is formed of a CPU 31, ROM 32, RAM 33, a communication controlling section 34, a storing section 35, and so forth which are connected to one another via a bus line 36.

The CPU 31 performs various kinds of information processing and overall control of the electronic money server 2 by executing the program product recorded on the ROM 32 and the storing section 35. For example, the CPU 31 performs recharging in response to a recharging request from the mobile terminal 5.

In payment by the asynchronous payment terminal 7, the electronic money server 2 receives the log data on the update of the value balance performed by the asynchronous payment terminal 7 from the asynchronous payment terminal 7 later and processes the log data.

Incidentally, in the case of the payment terminal 6 that can connect to the electronic money server 2 online, it is possible to perform payment processing by value by updating the value balance in real time while performing communication.

The ROM 32 is read-only memory, and a basic program product used by the electronic money server 2 to operate, a parameter, data, and so forth are recorded thereon.

The RAM 33 is readable/writable memory and offers working memory used when the CPU 31 performs information processing.

With the communication controlling section 34, the electronic money server 2 performs communication with the payment terminal 6, the asynchronous payment terminal 7, and the mobile terminal 5 via the communication line 8 and performs communication with the mobile terminal 5 via the Internet 3.

The storing section 35 is formed of, for example, a large-capacity hard disk, and an electronic money management program product and other program products which are used by the CPU 31 to perform payment processing by value and recharging, a user DB (database) managing a user's value balance and e-mail address, a store DB (A) managing the store IDs, store names, locations, and so forth of the member stores taking part in the electronic money system, a store DB (B) managing a breakdown data providing store flag, a batch processing cycle, and so forth, a payment terminal DB managing the IDs of the payment terminals and the IDs of installation stores, a log data DB storing the log data on which each payment processing is recorded, a breakdown data DB storing the breakdown data provided from a predetermined store, an e-mail (A) creation DB that is used in processing A which will be described later, an e-mail (A') creation DB, an e-mail (B) creation DB that is used in processing B, and so forth are recorded thereon.

In these e-mail (A) creation DB, e-mail (A') creation DB, and e-mail (B) creation DB, the past sent e-mail is accumulated in a state in which each piece of the past sent e-mail is related to an electronic money number and the contents to be sent are also stored in a state in which the contents are related to a sending condition.

Incidentally, in this example of FIG. 5, a single electronic money server 2 has been described, but this electronic money server 2 may be formed of a plurality of servers by distributing the functions thereof.

Next, the databases of the electronic money server 2 will be described by using each diagram of FIG. 6.

FIG. 6(A) is a diagram for explaining the logical configuration of the user DB.

In this embodiment, an electronic money number is stored in a state in which the electronic money number is related to a user ID. Though not depicted in the drawing, items such as authentication data of the general-purpose IC chip 25 are also stored.

An item "user ID" is user identification information.

An item "electronic money number" is identification information for distinguishing a value balance from the value balances of other users.

An item "management value of a value balance" is a value balance identified by the item "electronic money number". This value balance is updated by receiving the log data by batch processing.

Each of items "name", "address", "date of birth", and "telephone number" is information for identifying a user. All of these items are not required registration items and may not be provided in some cases.

An item "consent to receive information providing service" is the registration as to whether or not to have consented to reception of "information providing service" according to this embodiment.

An item "e-mail address" is an e-mail address for sending e-mail to the mobile terminal 5. In this embodiment, since it is based on the premise that electronic mail is sent to the mobile terminal 5 from the electronic money server 2, this item is a required registration item.

FIG. 6(B) is a diagram for explaining the logical configuration of the store DB (A).

The store DB (A) is formed of "store ID", "store name", "location", "telephone number", "e-mail address", and other items.

The item "store ID" is identification information for identifying each store of the member stores.

The item "location" is a required registration item since e-mail to be sent is determined depending on the location of the store in the processing A which will be described later. The other items are not required registration items and may not be provided in some cases.

FIG. 7(A) is a diagram for explaining the logical configuration of the store DB (B).

The store DB (B) is formed of "store ID", "breakdown data providing store flag", "batch processing cycle", and other items.

In the store DB (B), items necessary for processing in this embodiment are stored.

The item "breakdown data providing store flag" stores a flag indicating whether or not to provide the breakdown data of shopping or the like done by the store by using electronic money.

The item "batch processing cycle" indicates a cycle in which the log data is sent from the asynchronous payment terminal 7, for example, once a day (1:00 a.m.), once every two days (2:00 p.m.), and "at irregular intervals" in some cases.

Incidentally, in this example, the store DB (A) and the store DB (B) are assumed to be separate DBs, but the store DB (A) and the store DB (B) may be configured as a single DB.

FIG. 7(B) is a diagram for explaining the logical configuration of the payment terminal DB.

An item "payment terminal ID" is identification information for identifying the payment terminal.

An item "store ID of an installation store" corresponds to "store ID" in (2) and (3), and, by relating it to the "payment terminal ID", it is possible to search for the store in which the payment terminal is installed.

Figure 8:
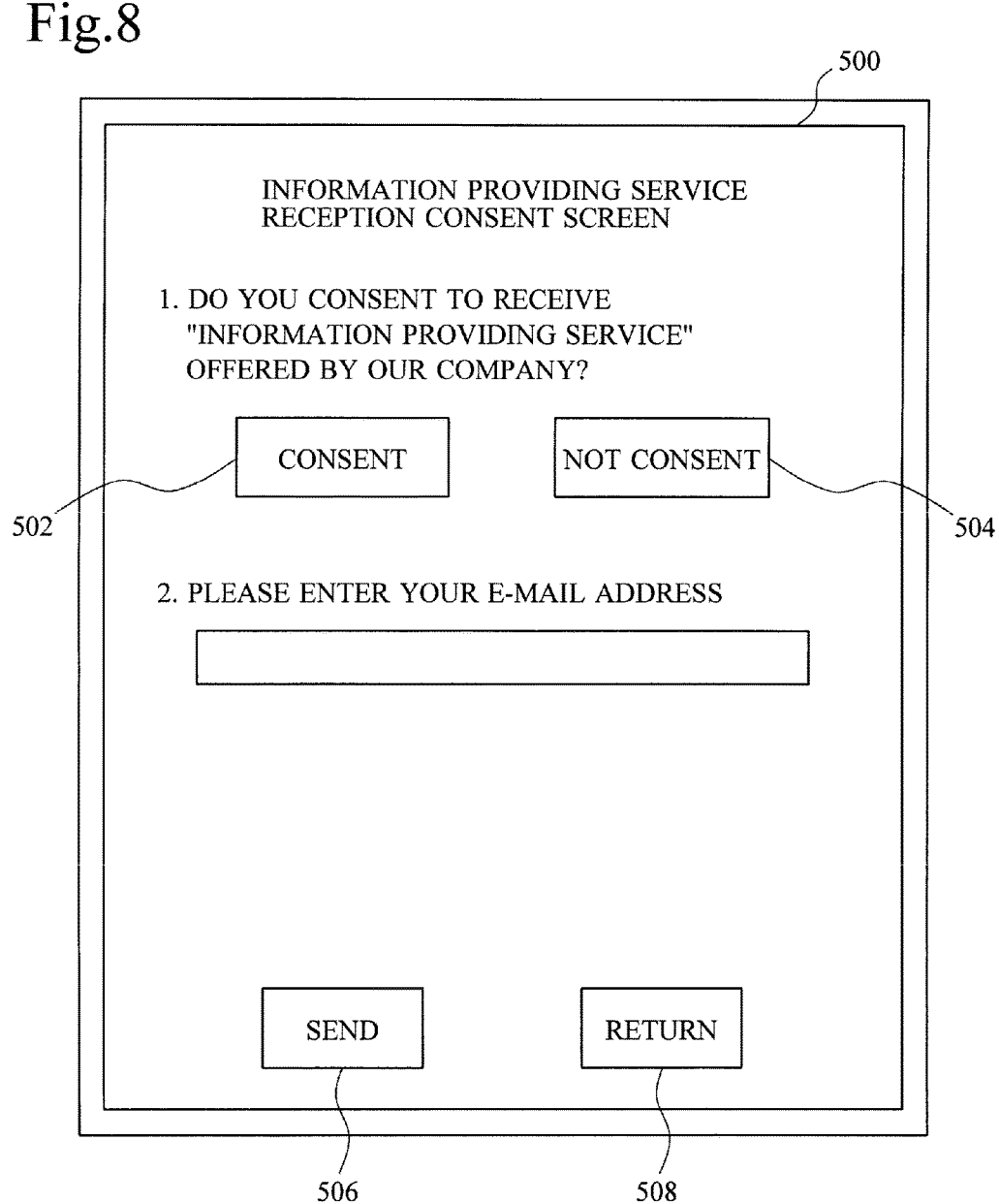
FIG. 8 is a diagram depicting an "information providing service" reception consent screen.

FIG. 8 is a diagram depicting a reception consent screen 500 of the "information providing service" from the electronic money server 2, the reception consent screen 500 which is displayed on the mobile terminal 5. The "information providing service" from the electronic money server 2 according to this embodiment is based on the premise that the user is registered in the electronic money server 2 in advance with the consent of the user and e-mail address is registered therein.

The information providing service reception consent screen 500 depicted in FIG. 8 is displayed as a result of the user accessing the electronic money server 2 from the mobile terminal 5 and making a request.

Then, if "CONSENT" 502 to reception, the "CONSENT" 502 of the information providing service reception consent screen 500 thus displayed, is selected by the user and e-mail address is entered and SEND 506 is selected, the electronic money server 2 accepts the consent to receive the "information providing service" and accepts the registration of the e-mail address.

Incidentally, if NOT CONSENT 504 is selected, the information providing service reception consent screen 500 is ended, and, if RETURN 508 is selected, the screen returns to an e-mail address entry screen.

Here, a condition may be set on this consent. For example, sending only information on a neighborhood store (only e-mail (A) which will be described later) or sending various information (e-mail (A) and e-mail (B) which will be described later).

Figure 9:
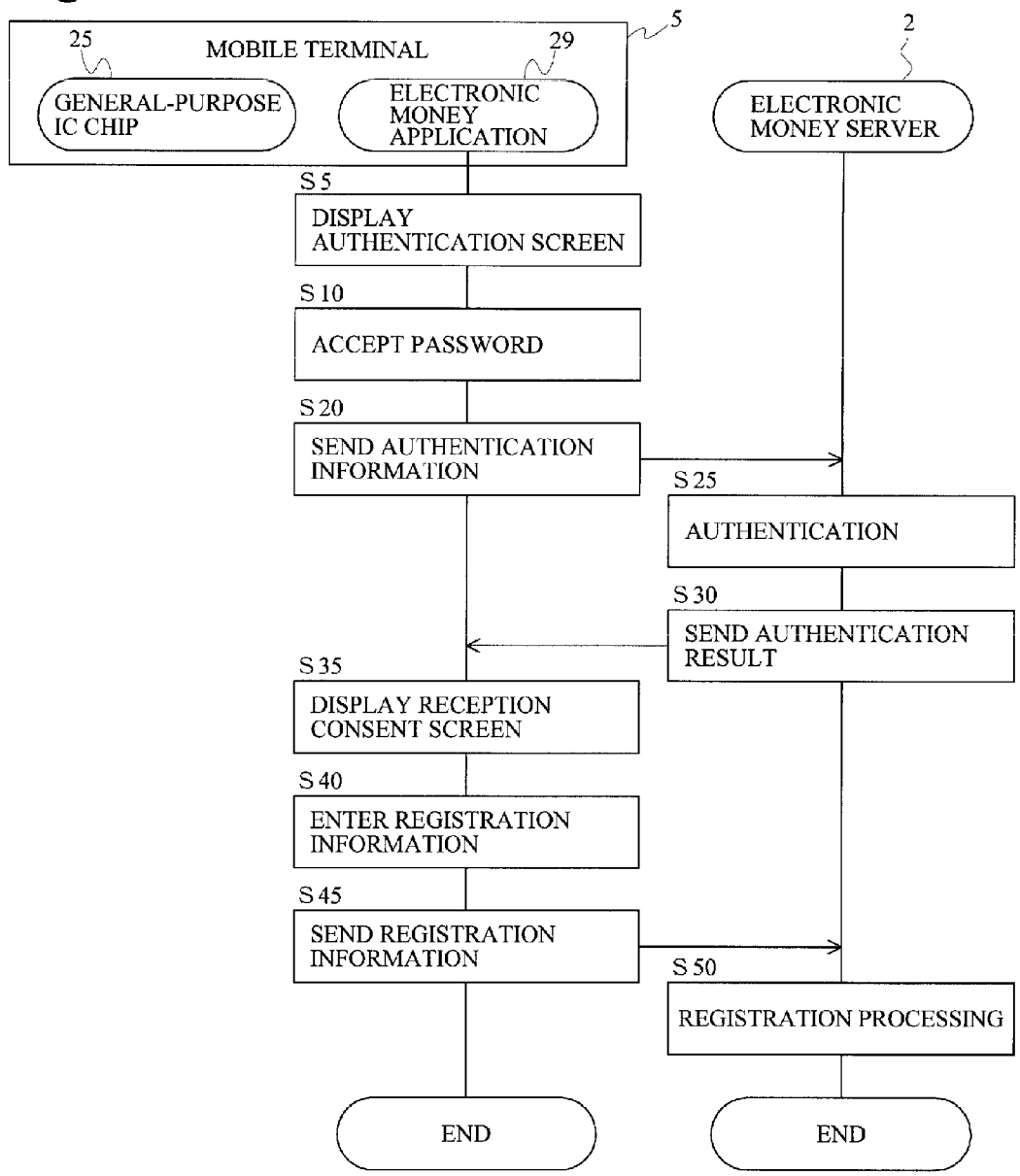
FIG. 9 is a flowchart depicting a procedure of registration processing of the "information providing service"

FIG. 9 is a flowchart for explaining a procedure by which registration of consent to reception of the "information providing service" from the electronic money server 2 and registration of e-mail address are made.

The following processing is performed by the CPU incorporated into the information processing section 26 of the general-purpose IC chip 25 of the mobile terminal 5, the CPU 11 incorporated into the mobile terminal 5, and the CPU 31 of the electronic money server 2 in accordance with an application program product for electronic money processing, a program product of the electronic money application 29, and a program product for the electronic money server, respectively.

First, the electronic money application 29 installed in the mobile terminal 5 accesses the electronic money server 2 by the operation performed by the user. Then, the electronic money server 2 sends top screen data to the electronic money application 29, and the electronic money application 29 displays atop screen on a display screen of the mobile terminal 5 by using it.

When the user selects any of the setting buttons on this top screen, the electronic money application 29 displays an authentication screen on a display (step 5).

Incidentally, it can also be configured such that the mobile terminal 5 requests authentication screen data from the electronic money server 2 and displays the authentication screen by using the authentication screen data sent from the electronic money server 2 in response thereto.

On the authentication screen, a password entry field and a send button are provided, and, when the user enters a password in the password entry field (step 10), the electronic money application 29 accepts the password and temporarily stores the password in the RAM or the like.

Then, when the user selects the send button, the electronic money application 29 reads an electronic money number from the general-purpose IC chip 25 by inputting an ID reference command to the general-purpose IC chip 25 and sends the password stored in the RAM and the electronic money number to the electronic money server 2 as authentication information (step 20).

When receiving the authentication information from the electronic money application 29, the electronic money server 2 performs authentication by comparing it with the password and the electronic money number stored in the user DB (step 25) and sends the authentication result to the electronic money application 29 (step 30).

When receiving the authentication result from the electronic money server 2, the electronic money application 29 displays an authentication result screen by using it.

If the electronic money server 2 has unsuccessfully authenticated the user, the contents informing an authentication error are displayed on the authentication result screen, and the user cannot make settings.

On the other hand, if the electronic money server 2 has successfully authenticated the user, the electronic money application 29 displays the information providing service reception consent screen (FIG. 8) on the display screen of the mobile terminal 5 (step 35).

The electronic money application 29 accepts the selection of CONSENT 502 from the user and accepts the entry of e-mail address (step 40).

When the user selects SEND 506, the electronic money application 29 sends the registration information to the electronic money server 2 (step 45).

The electronic money server 2 performs registration processing by receiving the registration information from the electronic money application 29 and recording it on the user DB (step 50). In this way, the registration processing related to the setting of consent to reception of the "information providing service" in the electronic money server 2 is completed.

Figure 10:
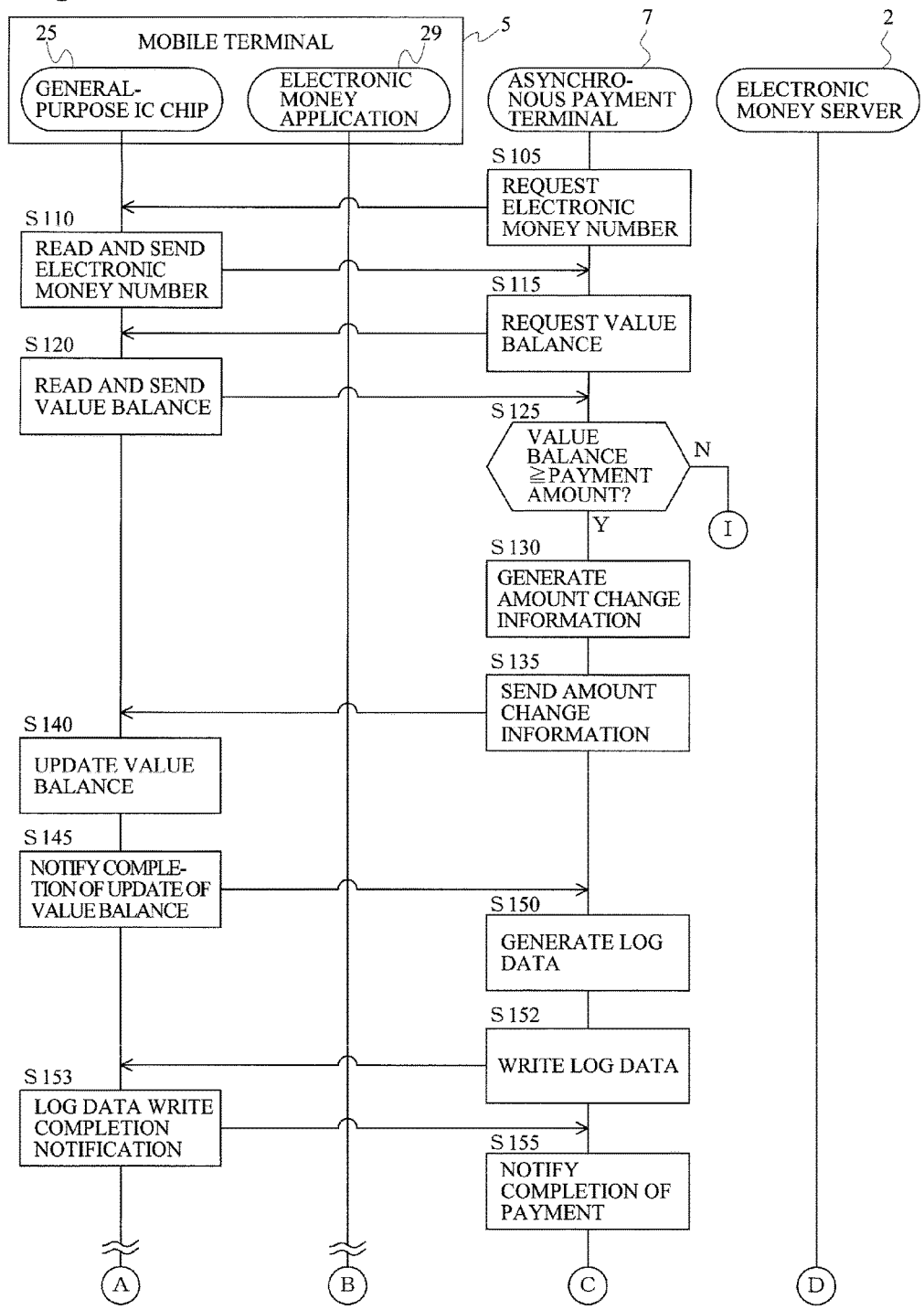
FIG. 10 is a flowchart depicting a processing procedure of this embodiment.
Figure 11:
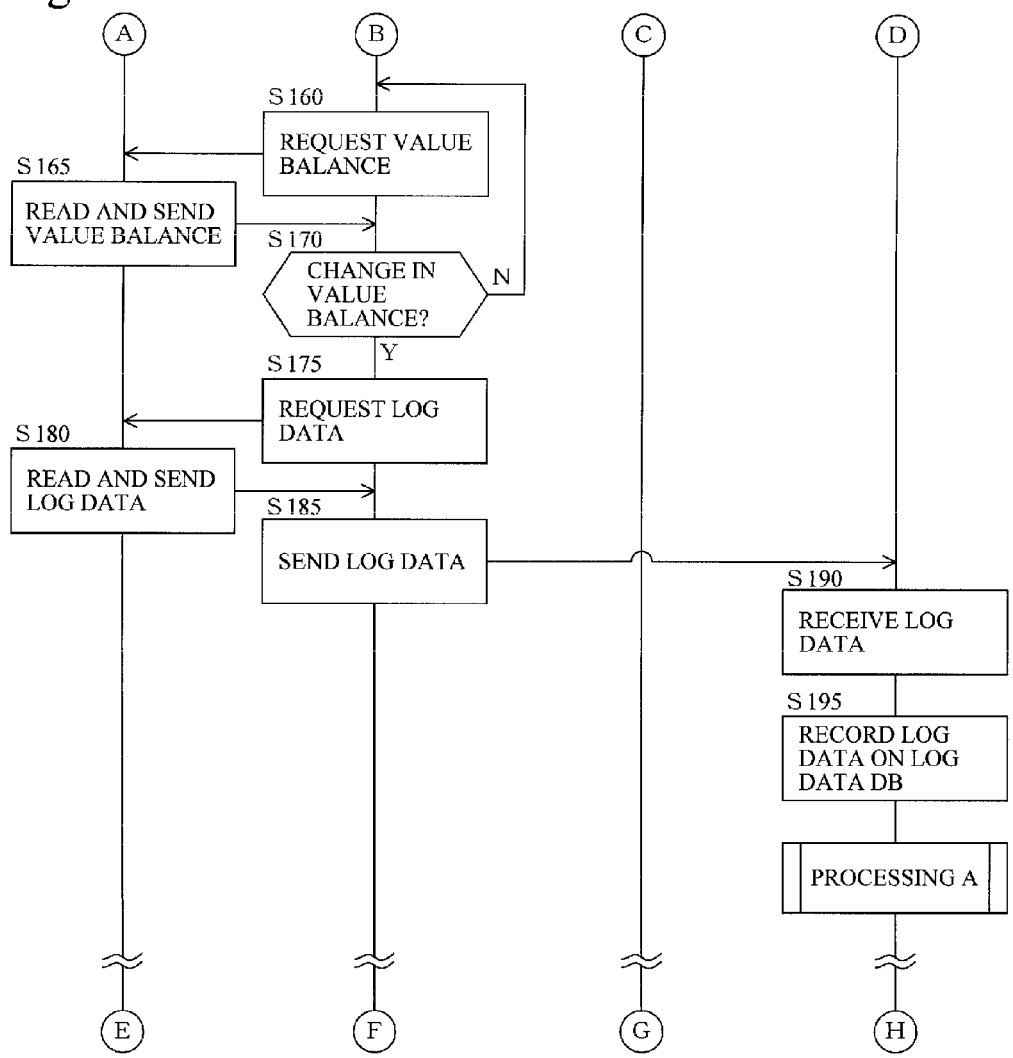
FIG. 11 is a flowchart depicting the processing procedure of this embodiment.
Figure 12:
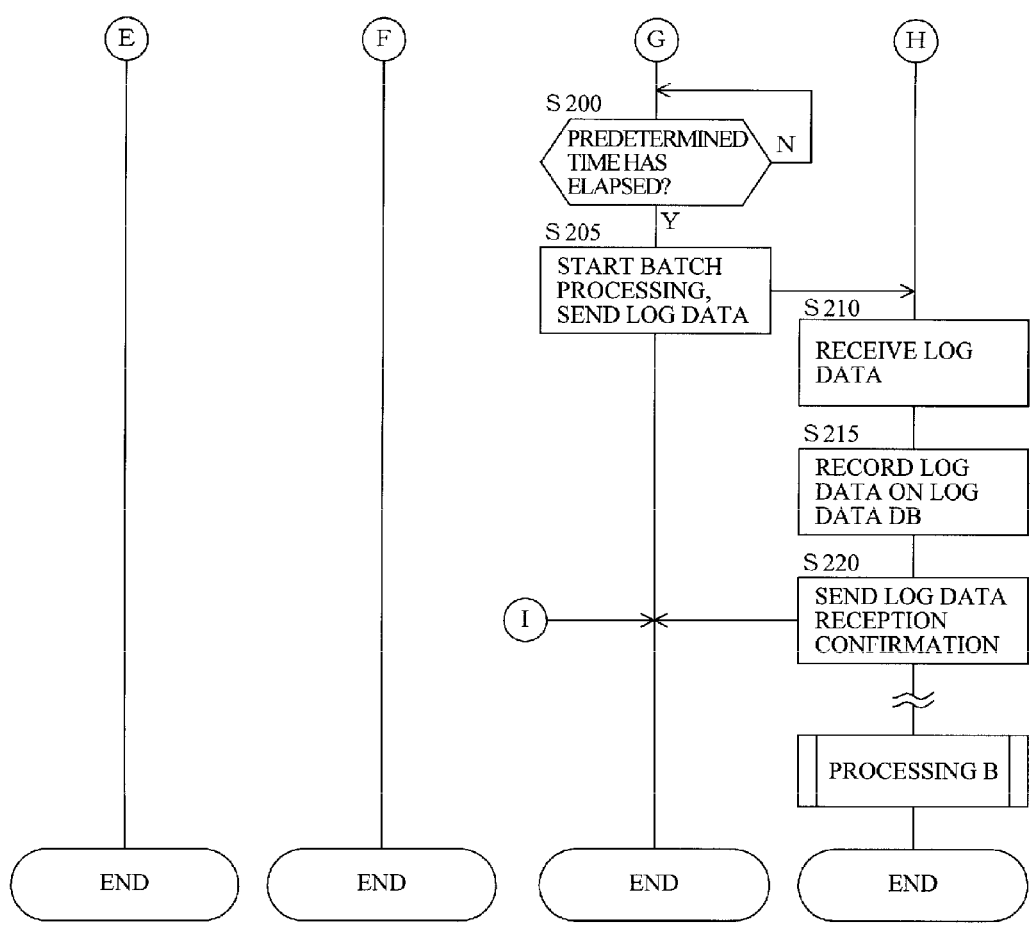
FIG. 12 is a flowchart depicting the processing procedure of this embodiment.

Next, processing procedures in the mobile terminal 5, the asynchronous payment terminal 7, and the electronic money server 2 in this embodiment will be described with reference to flowcharts of FIGS. 10, 11, and 12.

First, the user purchases a product in any member store and requests payment by electronic money. Then, the user is asked by a store clerk to pass the mobile terminal 5 with the general-purpose IC chip 25 incorporated thereinto or attached thereto over a reader/writer of the asynchronous payment terminal 7. Here, it becomes possible for the general-purpose IC chip 25 incorporated into or attached to the mobile terminal 5 and the asynchronous payment terminal 7 to send and receive data via the short-distance communication controlling section 17 of the mobile terminal 5.

First, the asynchronous payment terminal 7 requests an electronic money number from the general-purpose IC chip 25 (step 105). In response to this, the general-purpose IC chip 25 reads the electronic money number and sends the electronic money number to the asynchronous payment terminal 7 (step 110).

Next, the asynchronous payment terminal 7 requests the value balance from the general-purpose IC chip 25 (step 115). In response to this, the general-purpose IC chip 25 reads the value balance and sends the value balance to the asynchronous payment terminal 7 (step 120).

Here, the asynchronous payment terminal 7 compares the payment amount with the value balance (step 125). As a result, if the value balance is less than the payment amount (step 125; N), since payment is impossible, the asynchronous payment terminal 7 notifies the user and the store clerk that payment is impossible by producing payment impossible sound and ends the processing.

On the other hand, if the value balance is more than or equal to the payment amount (step 125; Y), the asynchronous payment terminal 7 generates amount change information (step 130) and sends the generated amount change information to the general-purpose IC chip 25 (step 135). This amount change information is information for updating (reducing or increasing) the value balance stored in the general-purpose IC chip 25. As the amount change information, as described earlier, there are two methods: a case in which an overwriting instruction is sent as a value balance update request and a case in which a subtraction instruction is sent as the value balance update request.

Here, the explained example deals with a case in which the amount change information by which the value balance is reduced as a result of payment being performed is sent, but there is also a case in which amount change information by which money is accepted in a store and the value balance is increased by an amount corresponding to the amount of money, which is called recharging, is sent.

The general-purpose IC chip 25 that has received the amount change information performs processing by which the value balance is updated in accordance with this amount change information (step 140). Then, the general-purpose IC chip 25 notifies the asynchronous payment terminal 7 of the update of the value balance (step 145).

In response to this notification, the asynchronous payment terminal 7 generates log data of payment (step 150). Moreover, the asynchronous payment terminal 7 writes log data containing the payment terminal ID (an example of store identification information) and a payment time (an example of time information) into the general-purpose IC chip 25 (step 152) and receives a log data write completion notification from the general-purpose IC chip 25 (step 153). Then, the asynchronous payment terminal 7 notifies the user and the store clerk of the completion of payment by, for example, producing payment completion sound (a sound effect indicating the completion of payment) (step 155).

In this way, a series of processing from the start of payment to the completion of payment is completed. Incidentally, it may be configured such that a payment completion notification in step 155 is made before the output of the log data of payment in step 150.

Here, the electronic money application 29 of the mobile terminal 5 requests the value balance from the general-purpose IC chip 25 at regular intervals (step 160), and, in response to this, the general-purpose IC chip 25 reads the value balance and sends the value balance to the electronic money application 29 (step 165). The electronic money application 29 stores the value balance at the time of the previous value balance request and compares that value balance with the value balance received this time (step 170). As a result, if there is no change in the value balance (step 170; N), the electronic money application 29 goes back to step 160 and requests the value balance again from the general-purpose IC chip 25 after a lapse of a predetermined period.

On the other hand, if there is a change in the value balance (step 170; Y), since this means that payment or recharging has been performed, the electronic money application 29 requests the general-purpose IC chip 25 to send the log data stored therein (step 175). In response to this request, the general-purpose IC chip 25 reads the stored log data and sends the log data to the electronic money application 29 (step 180).

In this example, a configuration is adopted in which the electronic money application 29 requests the value balance (step 160) and monitors a change in the value balance (step 170), but it may be configured such that, if there is a change in the value balance, a notification is automatically provided to the electronic money application 29 from the general-purpose IC chip 25.

Moreover, a configuration can also be adopted in which the electronic money application 29 acquires the value balance from the IC module when an electromagnetic wave of a particular frequency (for example, a carrier wave for short-distance radio communication) is detected by the short-distance communication controlling section 17 and checks a change in the value balance.

Furthermore, it may be configured such that, at this time, the log data is also sent from the general-purpose IC chip 25.

The electronic money application 29 that has received the log data from the general-purpose IC chip 25 sends the log data to the electronic money server 2 via the Internet 3 (step 185).

The electronic money server 2 receives the log data (step 190) and records the log data thus received on the log data DB of the storing section 35 (step 195).

Then, the electronic money server 2 performs the "processing A" which will be described later.

On the other hand, the asynchronous payment terminal 7 performs monitoring to determine whether or not a predetermined time has elapsed and the time has reached the batch processing cycle (step 200). This batch processing cycle is, for example, twice a day, once a day, or once every two days.

As a result, if the predetermined time has elapsed (step 200; Y), the asynchronous payment terminal 7 starts the batch processing and sends the log data to the electronic money server 2 via the communication line 8 (step 205).

The electronic money server 2 receives the log data (step 210) and records the received log data on the log data DB of the storing section 35 (step 215). Then, the electronic money server 2 sends a log data reception confirmation to the asynchronous payment terminal 7 via the communication line 8 (step 220).

Then, the electronic money server 2 performs the "processing B" which will be described later.

Next, with reference to a flowchart of FIG. 13, the processing procedure of the processing A will be described.

This processing A is processing which is performed when the log data is sent to the electronic money server 2 from the mobile terminal 5. In this case, as compared to a case in which the log data is sent from the asynchronous payment terminal 7 by batch processing, the electronic money server 2 can receive the log data promptly from the processing of payment or recharging. Therefore, there is a high possibility that the user is still near the store in which the user performed payment or recharging.

Incidentally, if the payment time contained in the log data is not after a time point a predetermined time prior to the current time point, since it is unlikely that the user is still near the store in which the user performed payment or recharging, it may be configured such that e-mail by the processing A is not sent.

First, the electronic money server 2 receives the log data (step 190), records the log data on the log data DB (step 195), and then identifies the store ID of the store in which the asynchronous payment terminal 7 is installed by searching the payment terminal DB by using the payment terminal ID of the log data as a key (step 300).

Next, the electronic money server 2 checks the breakdown data providing store flag of the store DB (B) by using the identified store ID as a key (step 305) and determines whether or not the store is a store that provides the breakdown data (step 310).

As a result, if the store is a store that provides the breakdown data (step 310; Y), this processing "A" is ended in order to perform the processing "B" which will be described later.

On the other hand, if the store is not a store that provides the breakdown data (step 310; N), the electronic money server 2 identifies the location of the store by searching the store DB (A) by using the store ID as a key (step 315).

Then, the electronic money server 2 searches the e-mail (A) creation DB by using the identified location as a key and acquires e-mail which conforms to the identified location. For example, information on a discount which is offered in a nearby store or information on cashback which is offered when a particular product is purchased in a nearby store. In this way, e-mail (A) is created (step 320).

Then, the electronic money server 2 searches the user DB by using the electronic money number of the received log data as a key and acquires the e-mail address of the user. The electronic money server 2 immediately sends, to this e-mail address, the created e-mail (A) to the mobile terminal 5 of the user (step 325).

Figure 14:
FIG. 14 is a diagram depicting an example of e-mail which is sent in the first embodiment.

In FIG. 14, an example of the e-mail (A) to be sent is depicted. In the example depicted here, first, gratitude for the use of "electronic money E" and information indicating that the location of the store is Shinjuku-ku and encouraging the use of electronic money E in Shinjuku-ku are sent.

Here, since the location is Shinjuku-ku, the information which can be used in Shinjuku-ku is provided, but the location may be more limited and may be Shinjuku-ku Nishi-Shinjuku, Shinjuku-ku Takadanobaba, or the like.

Moreover, conversely, the location may be set to a wider area, such as Shinjuku-ku, Nakano-ku, Shibuya-ku, or the like.

To the information to be sent, not only information on a discount or cashback, but also information on a nearby store that newly introduced "electronic money E", descriptions of a new café, or the like may be added.

Figure 15:
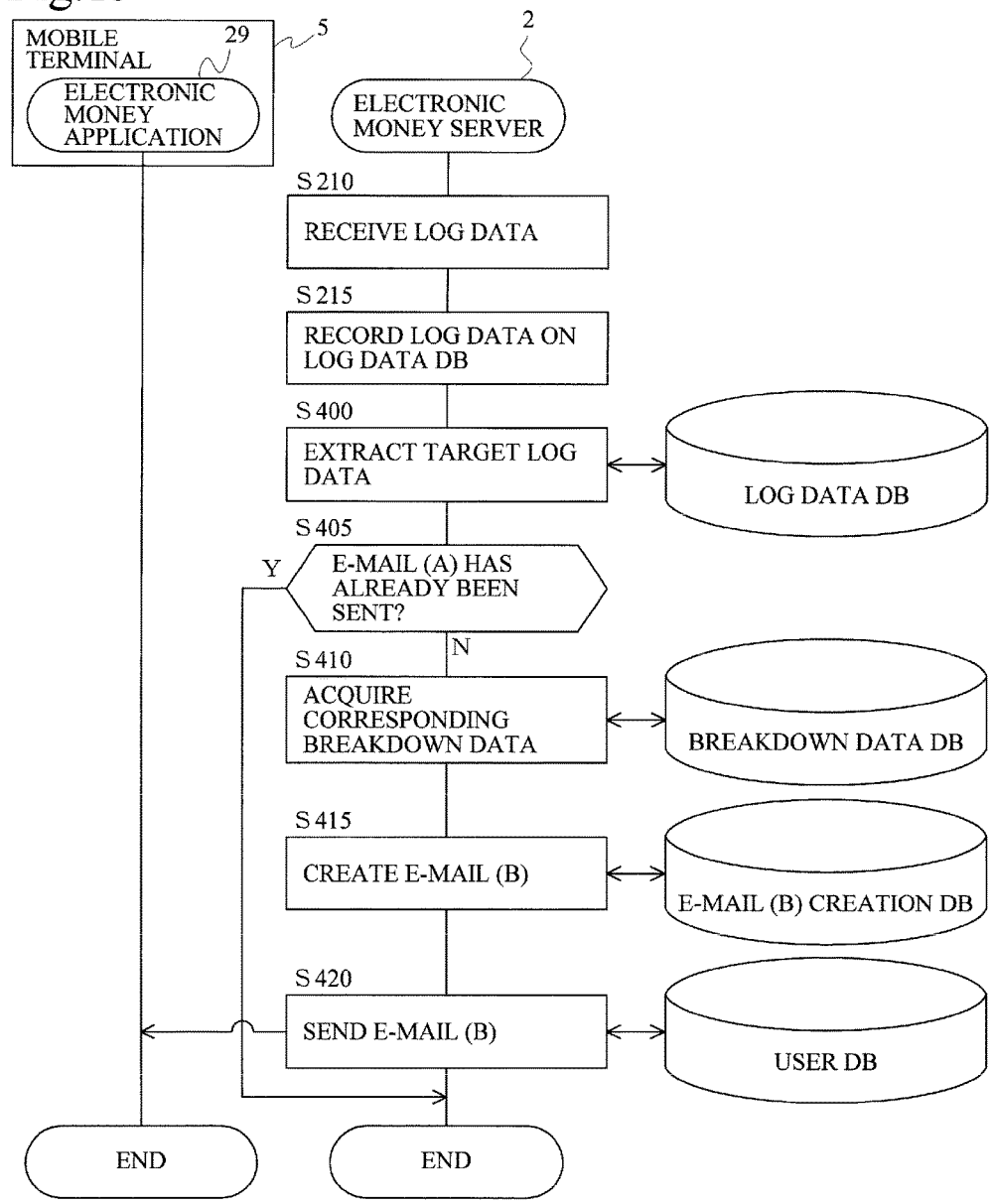
FIG. 15 is a flowchart for explaining a processing procedure of a second embodiment.

Next, with reference to a flowchart of FIG. 15, the processing procedure of the processing B will be described.

This processing B is processing which is performed when the log data is sent to the electronic money server 2 from the asynchronous payment terminal 7 by batch processing and the breakdown data is provided to the electronic money server 2 by a predetermined route. In this case, since the log data is sent from the asynchronous payment terminal 7 by batch processing, the electronic money server 2 receives the log data after a predetermined time has elapsed since processing of payment or recharging. Therefore, this processing is based on the premise that there is a high possibility that the user is not near the store in which the user performed payment or recharging anymore.

First, the electronic money server 2 receives the log data from the asynchronous payment terminal 7 via the communication line 8 (step 210) and records the log data on the log data DB of the storing section 35 (step 215).

Here, the electronic money server 2 extracts, from the log data DB, log data which is to be processed (step 400). Then, the electronic money server 2 determines whether or not the e-mail (A) has already been sent based on the extracted log data (step 405). As a result, if the e-mail (A) has already been sent (step 405; Y), which means the e-mail would be sent twice, the processing is ended.

On the other hand, if the e-mail (A) has not been sent (step 405; N), the electronic money server 2 starts a procedure to send e-mail (B).

First, the electronic money server 2 acquires an electronic money number from the received log data and acquires the past purchase history which is the breakdown data from the breakdown data DB by using the electronic money number as a key (step 410). Then, the electronic money server 2 creates e-mail (B) by referring to the e-mail (B) creation DB based on the acquired past purchase history and the breakdown data acquired this time (step 415).

Then, the electronic money server 2 acquires the e-mail address of the user by searching the user DB by using the electronic money number of the received log data as a key and sends the created e-mail (B) (step 420).

Unlike the above-described e-mail (A), since this e-mail (B) is sent after the breakdown data is acquired, as compared to the e-mail (A) which sends the information based on the location of the store in which payment or recharging was performed, it is possible to send information more suited to the needs of the user.

Figure 16:
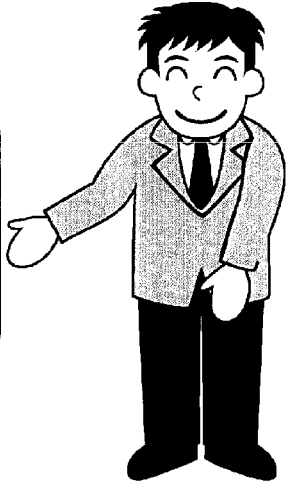
FIG. 16 is a diagram depicting an example of e-mail which is sent in the second embodiment.

Specifically, for the user who purchases beer two or three times per month, as depicted in FIG. 16, the contents thereof encourage the user to purchase company A's beer and nonalcoholic beer. Moreover, as a strategy, recommending wine or whiskey other than beer is also possible.

For the user who purchases a lunch box and a bottle of tea one or two times per week, the contents thereof are designed to encourage the user to purchase a lunch box, whereby an attempt to increase the frequency of purchase can be made.

As described above, since the e-mail (B) is created in consideration of the user's purchase history, it is possible to encourage the user to make purchases more effectively and thereby make an attempt to encourage the use of "electronic money".

Moreover, a plurality of stores may create an alliance with one another, and, when payment is made in one store, information encouraging purchase in the other store may be sent.

For example, a fast-food restaurant and a drugstore create an alliance, and, when payment is made in one store, the e-mail (B) encouraging purchase in the other store is sent.

FIG. 16 is a diagram depicting an example of the e-mail (B). Also to this e-mail (B), as is the case with the e-mail (A), not only information on a discount or cashback, but also information on a store that newly introduced "electronic money E", descriptions of a new café, or the like may be added.

Figure 13:
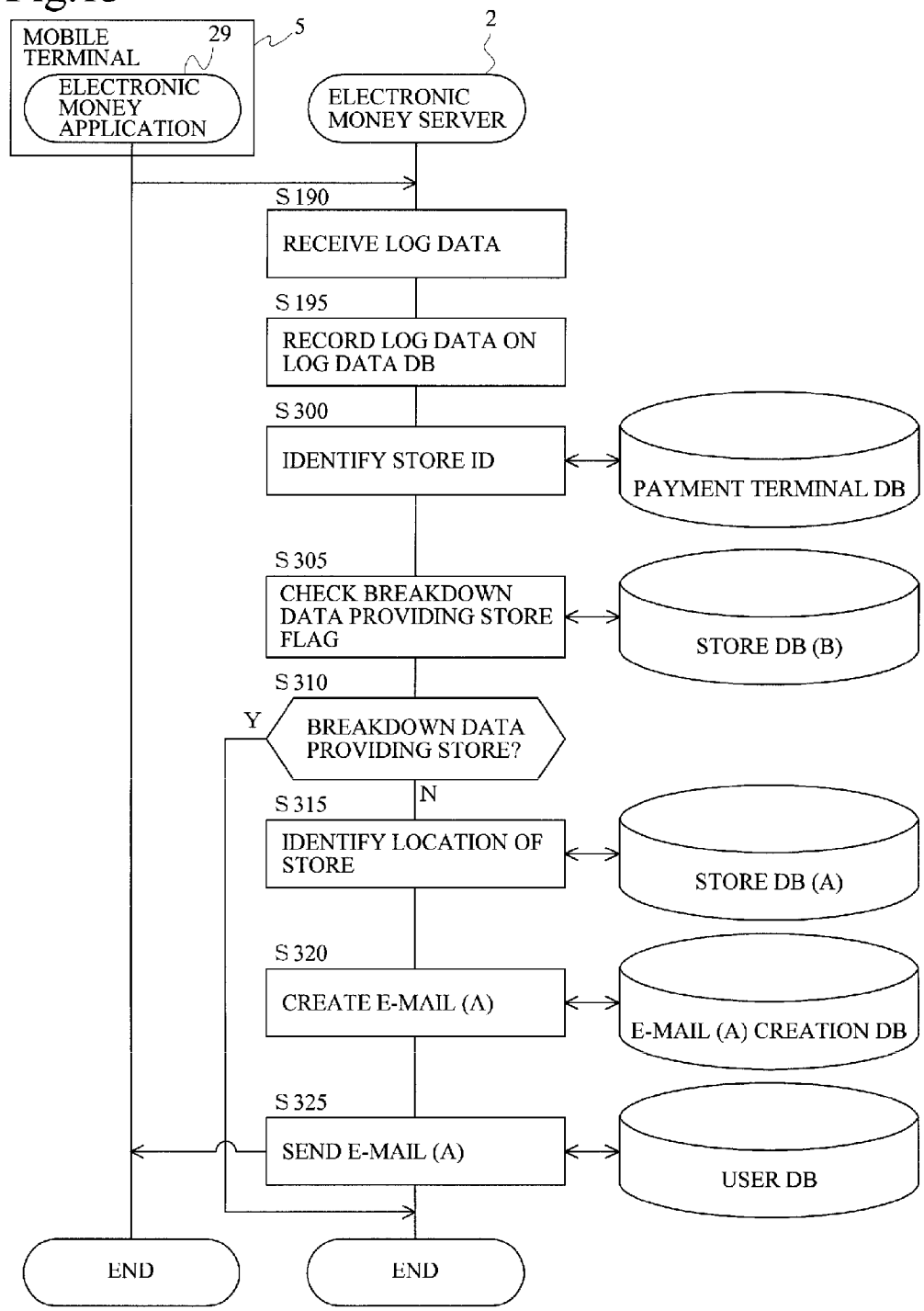
FIG. 13 is a flowchart for explaining a processing procedure of a first embodiment.
Figure 17:
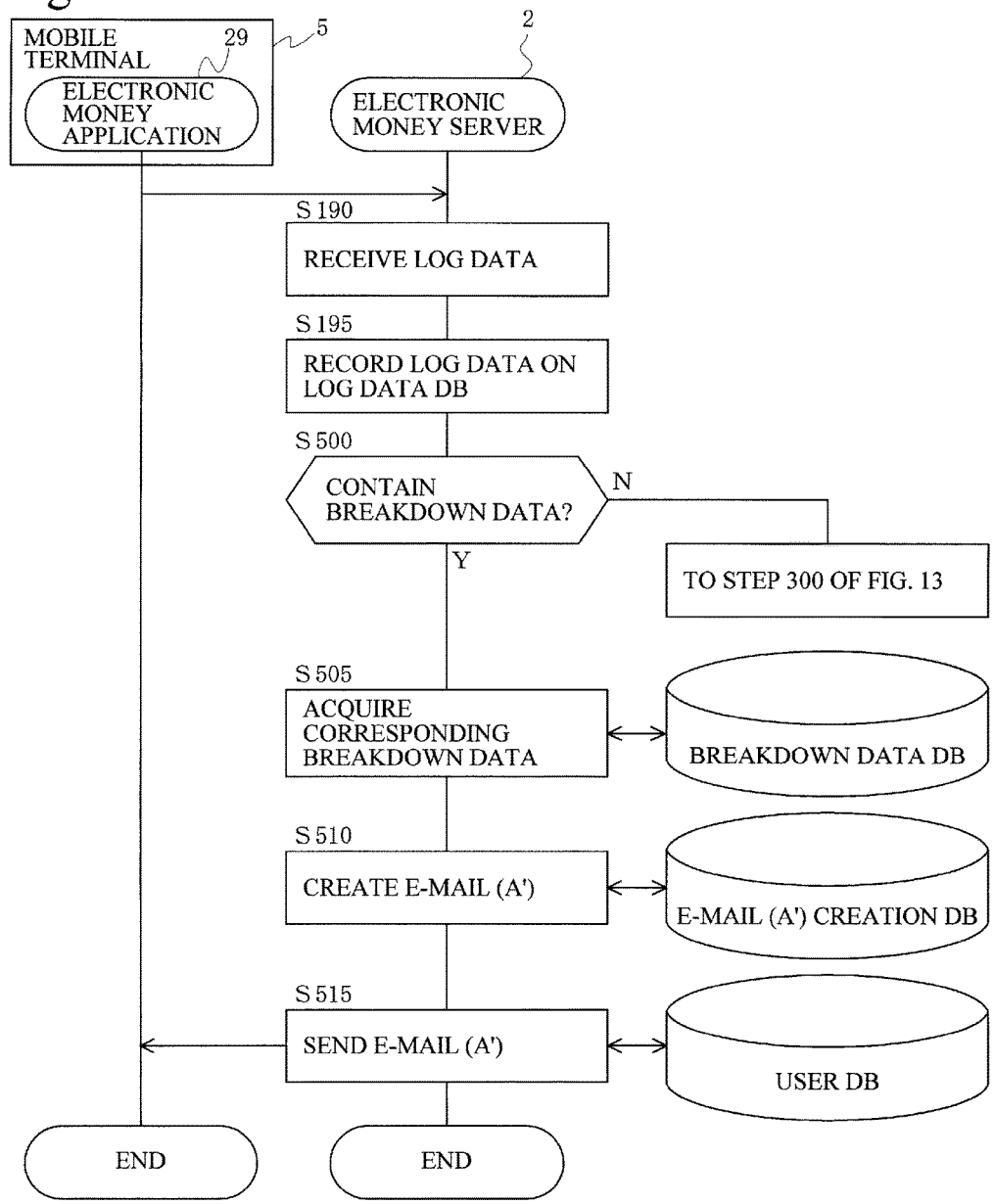
FIG. 17 is a flowchart for explaining a processing procedure of a modified example in the first embodiment.

FIG. 17 is a flowchart explaining a modified example of the processing "A" described in FIG. 13.

This modified example relates to processing which is performed when the log data that is sent to the electronic money server 2 from the mobile terminal 5 contains the breakdown data.

Incidentally, also in this modified example, if the payment time contained in the log data is not after a time point a predetermined time prior to the current time point, since it is unlikely that the user is still near the store in which the user performed payment or recharging, it may be configured such that the e-mail is not sent.

First, the electronic money server 2 receives the log data from the electronic money application 29 via the Internet 3 (step 190) and records the received log data on the log data DB of the storing section 35 (step 195).

Then, the electronic money server 2 determines whether or not the log data contains the breakdown data (step 500). As a result, if the log data does not contain the breakdown data (step 500; N), the electronic money server 2 proceeds to step 300 of FIG. 13 and creates and sends the e-mail (A).

On the other hand, if the log data contains the breakdown data (step 500; Y), the electronic money server 2 creates e-mail (A') in consideration of this breakdown data.

The electronic money server 2 acquires an electronic money number from the received log data and acquires the past purchase history which is the breakdown data from the breakdown data DB by using the electronic money number as a key (step 505). Then, the electronic money server 2 creates e-mail (A') by referring to the e-mail (A') creation DB based on the acquired past purchase history and the breakdown data acquired this time (step 510).

Then, the electronic money server 2 acquires the e-mail address of the user by searching the user DB by using the electronic money number of the received log data as a key. The electronic money server 2 immediately sends, to the e-mail address, the created e-mail (A') to the mobile terminal 5 of the user (step 515).

According to this modified example, as compared to a case in which e-mail is simply sent based on the location information, it is possible to send e-mail more suited to the needs of the user promptly.

In this modified example, the breakdown data is acquired, but the log data sometimes does not contain the breakdown data. At that time, the user him/herself may be made to send the contents corresponding to the breakdown data.

Specifically, there is a method by which the user is made to take an image of a barcode of the product which the user purchased with a camera of the mobile terminal 5 and sending of the image is accepted. At this time, a discount coupon for the product may be given.

Moreover, registration of purchase of a product may be accepted in advance and, when the product is actually purchased, a discount coupon for the product may be given. At this time, the user is made to send an image of the barcode as a proof of the actual purchase of the product.

Figure 18:
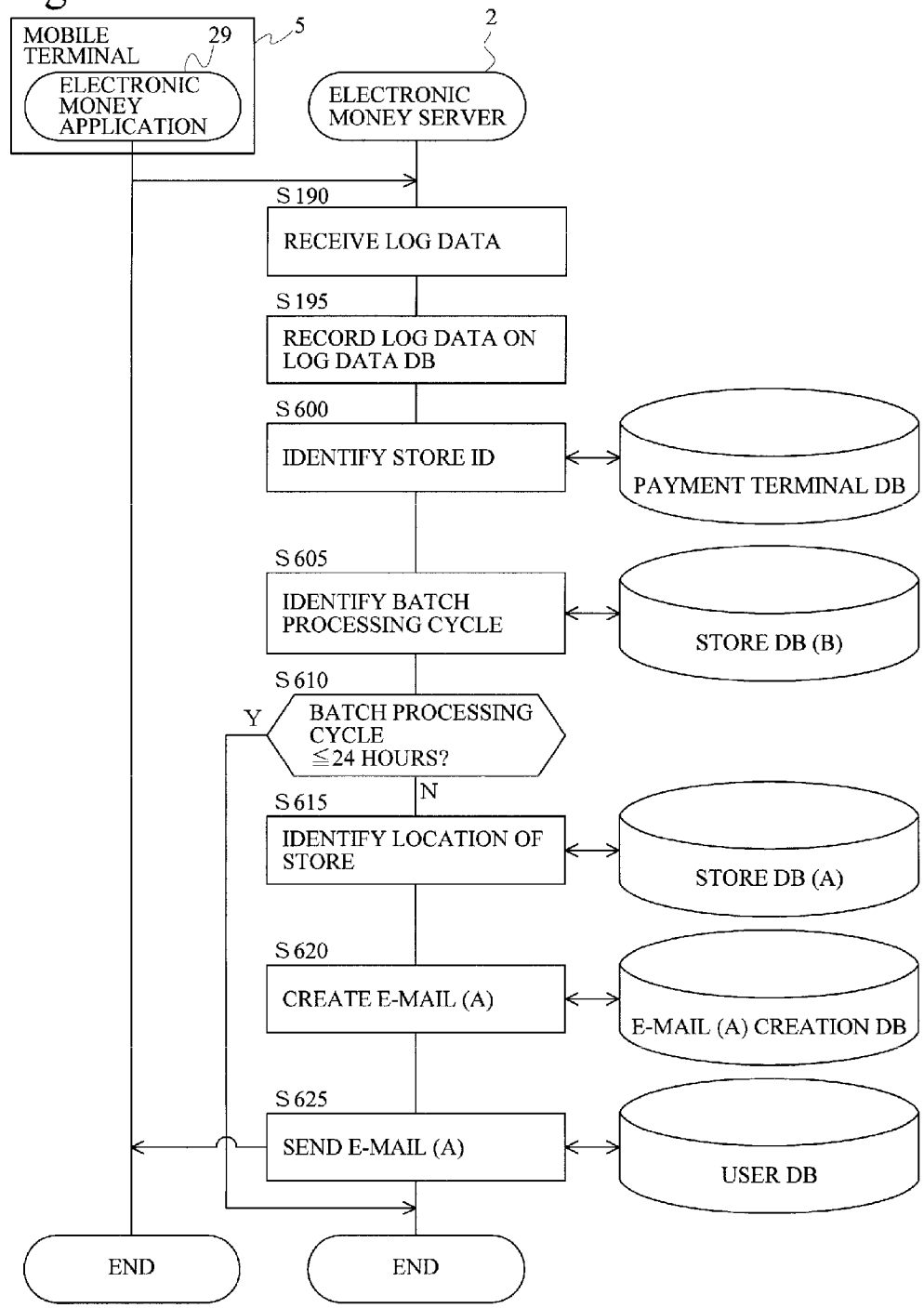
FIG. 18 is a flowchart for explaining a processing procedure of another modified example in the first embodiment.
Figure 19:
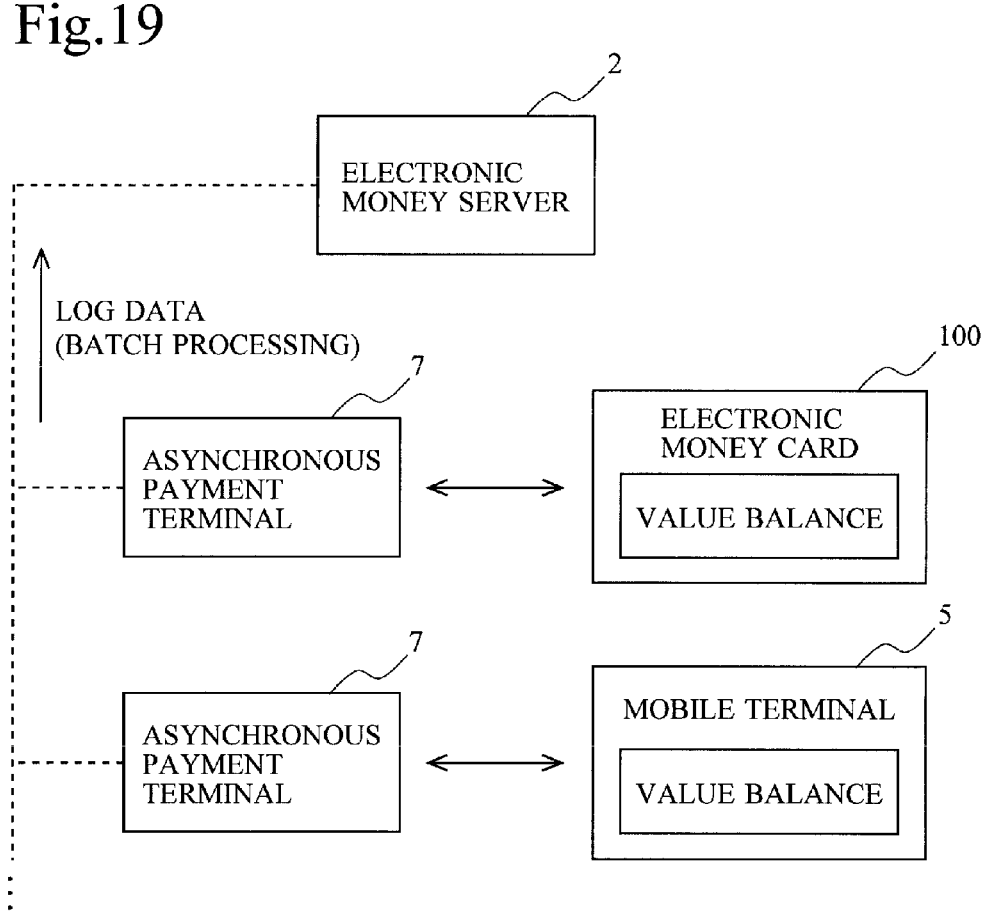
FIG. 19 is a diagram for explaining an existing electronic money system.

FIG. 18 is a flowchart explaining another modified example of the processing "A" described in FIG. 13.

This modified example relates to processing which is performed when the log data that is sent to the electronic money server 2 from the mobile terminal 5 contains the breakdown data.

First, the electronic money server 2 receives the log data from the electronic money application 29 via the Internet 3 (step 190) and records the received log data on the log data DB of the storing section 35 (step 195).

Then, the electronic money server 2 identifies the store ID of the store in which the asynchronous payment terminal 7 is installed by searching the payment terminal DB by using the payment terminal ID of the log data as a key (step 600).

Next, the electronic money server 2 identifies the batch processing cycle of the store DB (B) by using the identified store ID as a key (step 605) and determines whether or not the batch processing cycle is within 24 hours, for example (step 610).

As a result, if the batch processing cycle of the store is within 24 hours (step 610; Y), the electronic money server 2 ends this processing "A" to perform the processing "B".

On the other hand, if the batch processing cycle of the store is not within 24 hours (step 610; N), the electronic money server 2 searches the store DB (A) by using the store ID as a key and identifies the location of the store (step 615).

Next, the electronic money server 2 searches the e-mail (A) creation DB by using the identified location as a key and acquires the e-mail which conforms to the identified location. For example, information on a discount which is offered in a nearby store or information on cashback which is offered when a particular product is purchased in a nearby store. In this way, the electronic money server 2 creates the e-mail (A) (step 620).

Then, the electronic money server 2 searches the user DB by using the electronic money number of the received log data as a key and acquires the e-mail address of the user. The electronic money server 2 immediately sends the created e-mail (A) to the mobile terminal 5 of the user (step 625).

In this example, a criterion for determining the batch processing cycle is assumed to be 24 hours, but it is not limited thereto and may be longer or shorter than 24 hours. For example, the criterion can be appropriately set at 12 hours, 18 hours, 48 hours, or the like depending on the business situation.

Moreover, in the system of server-type electronic money in which the synchronous-type payment terminal 6 is used, since the batch processing cycle can be determined to be 0 hour, the processing "B" is performed in all cases.

Furthermore, by setting the batch processing cycle at an extremely short time, for example, 5 minutes, it is possible to divide processing between the system of server-type electronic money and the stored value-type system.

In the example described in FIG. 13, a criterion for determining whether the processing "A" or the processing "B" is performed is whether or not a store is a store that provides the breakdown data, but, in this example, the criterion is whether the batch processing cycle is long or short. This is because the processing "B" is performed if the log data can be received in a relatively short time and the processing "A" is performed promptly if it takes time to receive the log data.

In addition to those described above, the criterion for determining whether the processing "A" or the processing "B" is performed may be whether or not the store in which payment was performed is a cyber store. Since information on the neighborhood of the cyber store is completely meaningless information for the user, the processing "B" is performed in this case.

Moreover, if there are no other nearby stores in which electronic money can be used or the e-mail (A) has already been sent and there are no other contents to be sent, the processing "B" is performed.

Furthermore, in the case of payment in the system of server-type electronic money, the processing "B" is performed.

The user sometimes makes payment by electronic money in the same store or a nearby store in a relatively short time. In this case, settings can also be made such that pieces of e-mail of the same contents are prevented from being sent successively.

In the processing for creating the e-mail (A) (FIG. 13, step 320, FIG. 18, step 620), the e-mail DB is referred to. In this e-mail DB, the past sent e-mail is accumulated in a state in which an electronic money number is assigned to each piece of the past sent e-mail. Thus, when the e-mail (A) is created, the e-mail (A) is made to have the contents that do not overlap with the contents of the past sent e-mail.

Moreover, if there are not proper contents that do not overlap with the contents of the past sent e-mail, the e-mail (A) may not be sent or only gratitude for the use of electronic money may be sent.

When the electronic money server 2 holds the address of the user, that is, when the address is registered in the user DB, information on a location corresponding to a route between the location in which payment was performed and the address may be provided.

For example, if the payment location is "Nakano Sakaue" and the address is "Kichijoji", it can be presumed that the user changes trains at "Ogikubo" and therefore information on an area near "Ogikubo" is sent.

Moreover, if the user who usually makes payment by electronic money in Tokyo makes payment in Sapporo or Kyoto, for example, it can be presumed that the user visits that city on business or as a tourist and therefore the contents of the e-mail (A) may contain several pieces of information on the restaurants, hotels, amusement parks, and so forth in the city.

In the example described above, descriptions have been given on the assumption that the processing "A" and the processing "B" are exclusive, but the e-mail (B) may be sent after the e-mail (A) is sent.

In this case, when the e-mail (B) is created, the e-mail (A) creation DB is searched to check whether or not overlapping contents are contained therein. If overlapping contents are contained, the contents are deleted or changed to other contents.

EXPLANATIONS OF LETTERS OR NUMERALS 1 electronic money system
2 electronic money server
3 the Internet
4 store server
5 mobile terminal
6 payment terminal
7 asynchronous payment terminal
8 communication line
11 CPU
12 ROM
13 RAM
14 input section
15 output section
16 communication controlling section
17 short-distance communication controlling section
18 storing section
19 bus line
25 general-purpose IC chip
26 information processing section
27 storing section
31 CPU
32 ROM
33 RAM
34 communication controlling section
35 storing section
36 bus line
90 reader/writer
100 electronic money card

The invention claimed is:

1. An information delivery device comprising:
at least one memory configured to store computer program code; and
at least one processor configured to read said computer program code and operate as instructed by said computer program code, said computer program code including:
first acquiring code configured to cause at least one of said at least one processor to acquire, from a store terminal, log data containing store identification information identifying a store in which balance change processing has been performed, the balance change processing by which a balance of electronic money stored in an IC chip is changed;
second acquiring code configured to cause at least one of said at least one processor to acquire, from a mobile terminal connectable to the IC chip, the store identification information which is written into the IC chip in a state in which the store identification information is related to the balance change processing;
determining code configured to cause at least one of said at least one processor to determine, by referring to a store information database, whether or not related information that is related to the balance change processing has been acquired after a predetermined time has elapsed since the balance change processing has been performed;
first providing code configured to cause at least one of said at least one processor to immediately provide first information selected by using the store identification information acquired by the second acquiring code to the mobile terminal if the related information was acquired before the predetermined time has elapsed, wherein the first information comprises a first advertising message, and wherein the first advertising message is based on an estimated location of a user associated with the IC chip; and
second providing code configured to cause at least one of said at least one processor to provide second information selected by using the related information to the user of the IC chip associated with the balance change processing if the related information was acquired after the predetermined time has elapsed but before a second predetermined interval has elapsed, wherein the second information comprises a second advertising message, and wherein the second advertising message is based on a purchase history of the user.

2. The information delivery device according to claim 1, wherein
the related information is breakdown information related to the balance change processing, and wherein the program code further includes:
store information storing code configured to cause at least one of said at least one processor to store, for each store, data in the store information database indicating whether or not the store is a breakdown-providing store that provides the breakdown information after a completion of the balance change processing, and
when a store identified by the store identification information acquired by the second acquiring code is a breakdown-providing store, the determining code makes a determination that the predetermined period has elapsed.

3. The information delivery device according to claim 2, wherein
the first providing code is further configured to, only when the store identified by the store identification information acquired by the second acquiring code is a real store, cause at least one of said at least one processor to provide the first information.

4. The information delivery device according to claim 3, wherein
the store terminal further writes time information identifying a time at which the balance change processing has been performed into the IC chip in a state in which the time information is related to the balance change processing,
the second acquiring code is further configured to cause at least one of said at least one processor to acquire the time information which is written into the IC chip in a state in which the time information is related to the balance change processing, and when a time identified by the time information is a time indicates that the predetermined time has not elapsed, the first providing code causes at least one of said at least one processor to provide the first information related to another store located in an area including a location of the store identified by the store identification information.

5. The information delivery device according to claim 1, wherein the store information database is configured to store cycle information indicating a cycle of batch processing by which log data is sent, the log data which is generated by the generating unit in the store terminal, and the first providing code is further configured to cause at least one of said at least one processor to refer to the cycle information which is stored in the store information storing unit and, if acquiring the log data by the first acquiring code, when the related information is acquired after the second predetermined interval, provide the first information.

6. The information delivery device according to claim 1, wherein the first providing code is further configured to cause at least one of said at least one processor to provide the first information only when the related information is not provided by the second providing code.

7. The information delivery device according to claim 1, wherein the first providing code is further configured to cause at least one of said at least one processor to select the first information such that a same advertising message is not provided to the user within a third predetermined period.

8. An information delivery method by a computer, the method comprising:

acquiring, from a store terminal, log data containing store identification information identifying a store in which balance change processing has been performed, the balance change processing by which a balance of electronic money stored in an IC chip is changed;

acquiring, from a mobile terminal connectable to the IC chip, the store identification information which is written into the IC chip in a state in which the store identification information is related to the balance change processing;

determining, by referring to a store information database, whether or not related information that is related to the balance change processing has been acquired after a predetermined time has elapsed since the balance change processing has been performed;

immediately providing first information selected by using the acquired store identification information to the mobile terminal if the related information was acquired before the predetermined time has elapsed, wherein the first information comprises a first advertising messaged, and wherein the first advertising message is based on an estimated location of a user associated with the IC chip; and providing second information selected by using the related information to the user of the IC chip associated with the balance change processing if the related information was acquired after the predetermined time has elapsed but before a second predetermined interval has elapsed, wherein the second information comprises a second advertising message, and wherein the second advertising message is based on a purchase history of the user.

9. A non-transitory computer-readable recording medium on which a program product is recorded, the program product for causing a computer to perform:

acquiring, from a store terminal, log data containing store identification information identifying a store in which balance change processing has been performed, the balance change processing by which a balance of electronic money stored in an IC chip is changed;

acquiring, from a mobile terminal connectable to the IC chip, the store identification information which is written into the IC chip in a state in which the store identification information is related to the balance change processing;

determining, by referring to a store information database, whether or not related information that is related to the balance change processing has been acquired after a predetermined time has elapsed since the balance change processing has been performed;

immediately providing first information selected by using the acquired store identification information to the mobile terminal if the related information was acquired before the predetermined time has elapsed, wherein the first information comprises a first advertising messaged, and wherein the first advertising message is based on an estimated location of a user associated with the IC chip; and providing second information selected by using the related information to a user of the IC chip associated with the balance change processing if the related information was acquired after the predetermined time has elapsed but before a second predetermined interval has elapsed, wherein the second information comprises a second advertising message, and wherein the second advertising message is based on a purchase history of the user.

* * * * *